(12) United States Patent
Sikri et al.

(10) Patent No.: US 8,576,743 B2
(45) Date of Patent: Nov. 5, 2013

(54) APPARATUS AND METHODS FOR ESTIMATING AN UNKNOWN FREQUENCY ERROR OF A TONE SIGNAL

(75) Inventors: Divaydeep Sikri, San Diego, CA (US); Hassan Rafique, San Diego, CA (US); Cetin Altan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/333,550

(22) Filed: Dec. 21, 2011

(65) Prior Publication Data

US 2012/0327793 A1 Dec. 27, 2012

Related U.S. Application Data

(60) Provisional application No. 61/427,774, filed on Dec. 28, 2010, provisional application No. 61/434,361, filed on Jan. 19, 2011.

(51) Int. Cl.
*G01R 31/08* (2006.01)

(52) U.S. Cl.
USPC .......................................... 370/252

(58) Field of Classification Search
USPC ......... 370/252, 254, 350, 484, 503, 516, 509; 375/260, 343, 346, 348, 354–359
See application file for complete search history.

(56) References Cited

U.S. PATENT DOCUMENTS

| | | | |
|---|---|---|---|
| 5,790,604 A | 8/1998 | Kelton et al. | |
| 7,012,881 B2 * | 3/2006 | Kim | 370/208 |
| 7,062,282 B2 | 6/2006 | Liu et al. | |
| 7,171,162 B2 | 1/2007 | Lin et al. | |
| 7,590,419 B2 | 9/2009 | Chen | |
| 7,620,125 B1 * | 11/2009 | Chang et al. | 375/326 |
| 8,014,476 B2 | 9/2011 | Filipovic et al. | |
| 2002/0196731 A1 * | 12/2002 | Laroia et al. | 370/206 |
| 2004/0196928 A1 * | 10/2004 | Hessel | 375/340 |
| 2007/0217495 A1 * | 9/2007 | Han et al. | 375/227 |
| 2007/0265791 A1 | 11/2007 | Valadon | |
| 2009/0243394 A1 * | 10/2009 | Levine | 307/104 |

FOREIGN PATENT DOCUMENTS

WO 2009140338 A2 11/2009

OTHER PUBLICATIONS

Staszewski, R. B. et al. (Jun. 2005). "Crystal Drift Compensation in a Mobile Phone." IET Irish Signals and Systems Conference (ISSC), pp. 241-245. ISBN: 0-86341-655-9.
Varma, G. N. et al. (2004). "Robust Frequency Detection Algorithm for GSM/GPRS." 2004 IEEE 60th Vehicular Technology Conference, vol. 6, 3843-3846.
International Search Report and Written Opinion—PCT/US2011/066970—ISA/EPO—Jun. 22, 2012.

* cited by examiner

*Primary Examiner* — Mark Rinehart
*Assistant Examiner* — Peter Cheng
(74) *Attorney, Agent, or Firm* — QUALCOMM IP Department; James Hunt Yancey, Jr.

(57) ABSTRACT

Estimating an unknown frequency error of a tone signal may comprise sampling, within an error bandwidth, wireless signals including the tone signal that occupy the error bandwidth to generate signal samples, and repeatedly, for different frequency offsets: applying a frequency offset to the signal samples to produce offset values that represent the signals occupying an offset bandwidth equal to the error bandwidth offset by an offset frequency; estimating, within a frequency estimation range less than the error bandwidth, a tone frequency error using the offset values; and measuring a signal-to-noise ratio of the tone signal using the signal samples and the estimated tone frequency error. Other aspects, embodiments, and features are also claimed and discussed.

57 Claims, 18 Drawing Sheets

| Tail (3) | Constant '0' or '1' bits (142) | Tail (3) | GP (8.25) |

Frequency Correction Burst

*FIG. 4B*

APPARATUS AND METHODS FOR ESTIMATING AN UNKNOWN FREQUENCY ERROR OF A TONE SIGNAL

CROSS REFERENCE TO RELATED APPLICATIONS & PRIORITY CLAIM

This patent application claims the benefit of and priority to (a) Provisional Application No. 61/427,774 entitled "APPARATUS AND METHODS FOR DETECTING AND ESTIMATING A FREQUENCY ERROR OF A TONE IN A STREAM OF DATA SYMBOLS" filed Dec. 28, 2010, and to (b) Provisional Application No. 61/434,361 entitled "APPARATUS AND METHODS FOR ESTIMATING AN UNKNOWN FREQUENCY ERROR OF A TONE SIGNAL" filed Jan. 19, 2011. Both of said applications are assigned to the assignee hereof and are hereby expressly incorporated by reference herein as if fully set forth below in their entireties.

TECHNICAL FIELD

The present disclosure relates generally to communication systems. More specifically, the present disclosure relates to estimating an unknown frequency error of a tone signal.

BACKGROUND

Wireless communication systems have become an important means by which many people worldwide have come to communicate. A wireless communication system may provide communication for a number of subscriber stations, each of which may be serviced by a base station. A subscriber station may communicate with one or more base stations via transmissions on the uplink and the downlink. The uplink (or reverse link) generally refers to the communication link from the subscriber station to the base station, and the downlink (or forward link) generally refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Benefits may be realized by improved methods and apparatuses related to the operation of wireless communication systems.

BRIEF SUMMARY

Exemplary embodiments of the invention are directed to estimating an unknown frequency error of a tone signal. Sample aspects and embodiments are summarized below.

In one aspect, a method is provided for estimating an unknown frequency error of a tone signal. The method may comprise, for example: sampling, within an error bandwidth, wireless signals including the tone signal that occupy the error bandwidth to generate signal samples; applying a frequency offset to the signal samples to produce offset values that represent the signals occupying an offset bandwidth equal to the error bandwidth offset by an offset frequency; estimating, within a frequency estimation range less than the error bandwidth, a tone frequency error using the offset values; measuring a signal-to-noise ratio of the tone signal using the signal samples and the estimated tone frequency error; repeating the applying, estimating, and measuring for different frequency offsets; and determining, when a particular frequency offset has been applied which results in a particular estimated tone frequency error and a measured signal-to-noise ratio that is above a threshold, that the particular estimated tone frequency error is equal to the unknown frequency error of the tone signal.

In another aspect, an apparatus is provided for estimating an unknown frequency error of a tone signal. The apparatus may comprise, for example, a sampler for sampling, within an error bandwidth, wireless signals including the tone signal that occupy the error bandwidth to generate signal samples, and various signal processing circuitry. The signal processing circuitry may be configured to, for example: apply a frequency offset to the signal samples to produce offset values that represent the signals occupying an offset bandwidth equal to the error bandwidth offset by an offset frequency; estimate, within a frequency estimation range less than the error bandwidth, a tone frequency error using the offset values; measure a signal-to-noise ratio of the tone signal using the signal samples and the estimated tone frequency error; repeat the applying, estimating, and measuring for different frequency offsets; and determine, when a particular frequency offset has been applied which results in a particular estimated tone frequency error and a measured signal-to-noise ratio that is above a threshold, that the particular estimated tone frequency error is equal to the unknown frequency error of the tone signal.

In yet another aspect, another apparatus is provided for estimating an unknown frequency error of a tone signal. The apparatus may comprise, for example: means for sampling, within an error bandwidth, wireless signals including the tone signal that occupy the error bandwidth to generate signal samples; means for applying a frequency offset to the signal samples to produce offset values that represent the signals occupying an offset bandwidth equal to the error bandwidth offset by an offset frequency; means for estimating, within a frequency estimation range less than the error bandwidth, a tone frequency error using the offset values; means for measuring a signal-to-noise ratio of the tone signal using the signal samples and the estimated tone frequency error; means for repeating the applying, estimating, and measuring for different frequency offsets; and means for determining, when a particular frequency offset has been applied which results in a particular estimated tone frequency error and a measured signal-to-noise ratio that is above a threshold, that the particular estimated tone frequency error is equal to the unknown frequency error of the tone signal.

In yet another aspect, a computer-readable medium is provided comprising code, which, when executed by a processor, cause the processor to perform operations for estimating an unknown frequency error of a tone signal. The computer-readable medium may comprise, for example: code for sampling, within an error bandwidth, wireless signals including the tone signal that occupy the error bandwidth to generate signal samples; code for applying a frequency offset to the signal samples to produce offset values that represent the signals occupying an offset bandwidth equal to the error bandwidth offset by an offset frequency; code for estimating, within a frequency estimation range less than the error bandwidth, a tone frequency error using the offset values; code for measuring a signal-to-noise ratio of the tone signal using the signal samples and the estimated tone frequency error; code for repeating the applying, estimating, and measuring for different frequency offsets; and code for determining, when a particular frequency offset has been applied which results in a particular estimated tone frequency error and a measured signal-to-noise ratio that is above a threshold, that the particular estimated tone frequency error is equal to the unknown frequency error of the tone signal.

BRIEF DESCRIPTION OF THE DRAWINGS

The accompanying drawings are presented to aid in the description of embodiments of the invention and are provided solely for illustration of the embodiments and not limitation thereof.

FIG. 4B shows an example FCCH burst formats in GSM.

DETAILED DESCRIPTION OF EXEMPLARY EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

Figure 1:
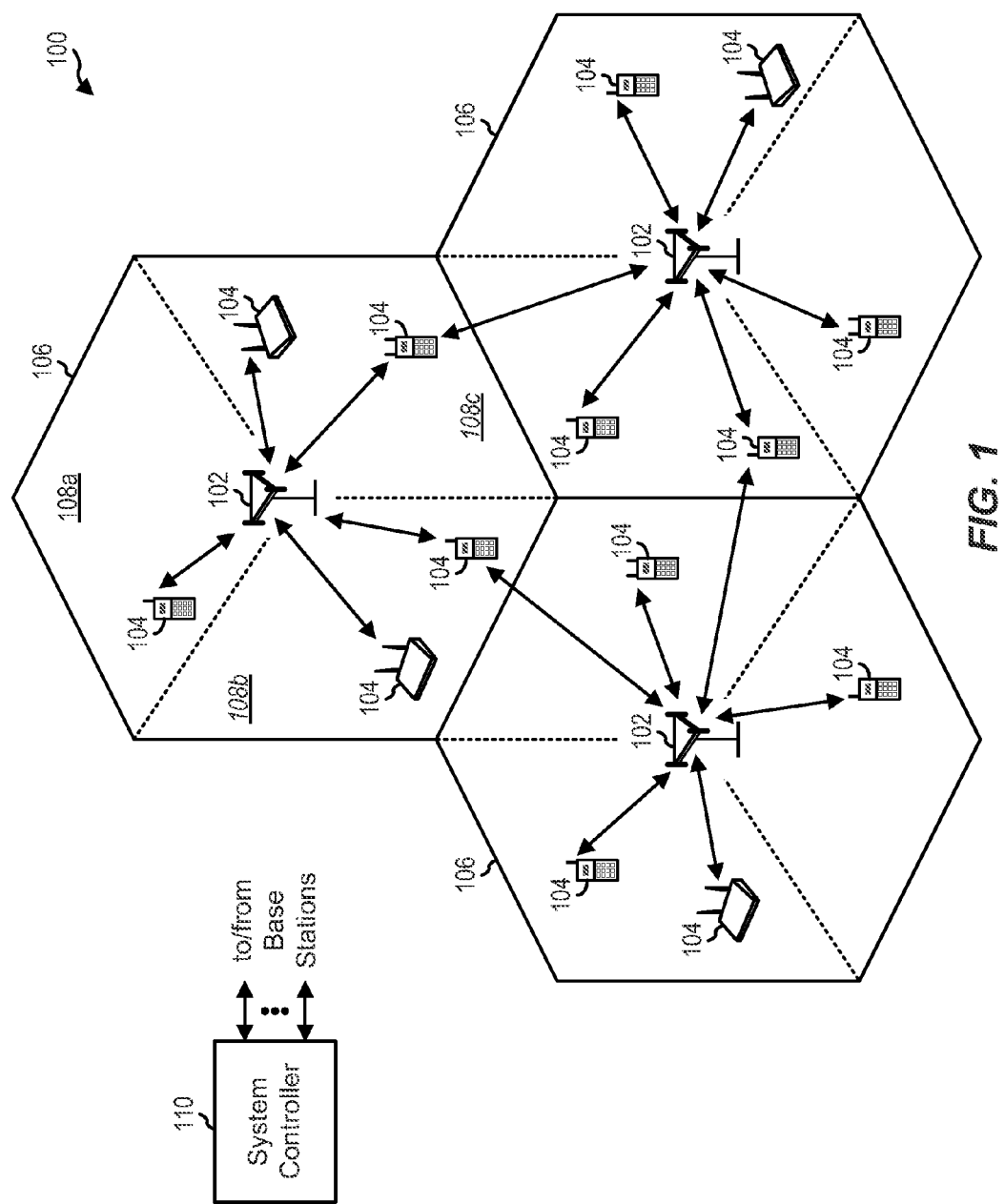
FIG. 1 shows an example of a wireless communication system in which the methods and apparatus disclosed herein may be utilized.

FIG. 1 shows an example of a wireless communication system 100 in which the methods and apparatuses disclosed herein may be utilized. The wireless communication system 100 includes multiple base stations (BS) 102 and multiple wireless communication devices 104. Each base station 102 provides communication coverage for a particular geographic area 106. The term "cell" can refer to a base station 102 and/or its coverage area 106 depending on the context in which the term is used.

As used herein, the term "wireless communication device" refers to an electronic device that may be used for voice and/or data communication over a wireless communication system. Examples of wireless communication devices include cellular phones, personal digital assistants (PDAs), handheld devices, wireless modems, laptop computers, personal computers, etc. A wireless communication device may alternatively be referred to as an access terminal, a mobile terminal, a mobile station, a remote station, a user terminal, a terminal, a subscriber unit, a subscriber station, a mobile device, a wireless device, user equipment (UE), or some other similar terminology. The term "base station" refers to a wireless communication station that is installed at a fixed location and used to communicate with subscriber stations. A base station may alternatively be referred to as an access point, a Node B, an evolved Node B, or some other similar terminology.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the wireless communication system 100. A subscriber station 104 may communicate with zero, one, or multiple base stations 102 on the downlink and/or uplink at any given moment.

For a centralized architecture, a system controller 110 may be couple to the base stations 102 and provide coordination and control for the base stations 102. The system controller 110 may be a single network entity or a collection of network entities. For a distributed architecture, base stations 102 may communicate with one another as needed.

Figure 2:
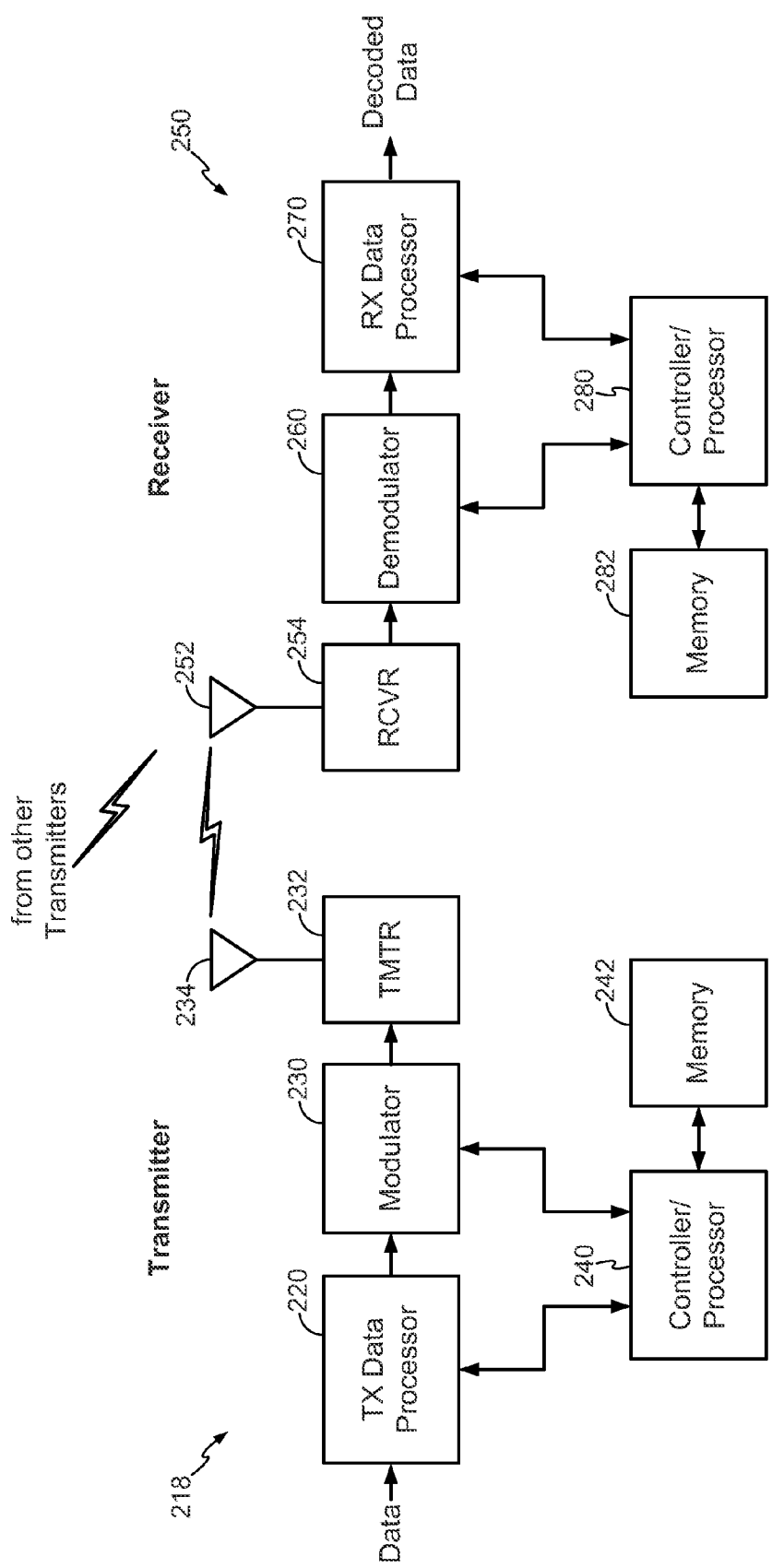
FIG. 2 shows a block diagram of a transmitter and a receiver in a wireless communication system.

FIG. 2 shows a block diagram of a transmitter 218 and a receiver 250 for use in a wireless communication system such as the one illustrated in FIG. 1. For the downlink, the transmitter 218 may be part of a base station (e.g., one of the base stations 102), and receiver 250 may be part of a wireless device (e.g., one of the wireless communication devices 104). For the uplink, the transmitter 218 may be part of a wireless device (e.g., one of the wireless communication devices 104), and receiver 250 may be part of a base station (e.g., one of the base stations 102).

At transmitter 218, a transmit (TX) data processor 220 receives and processes (e.g., formats, encodes, and interleaves) data and provides coded data. A modulator 230 performs modulation on the coded data and provides a modulated signal. Modulator 230 may perform Gaussian minimum shift keying (GMSK) for GSM, 8-ary phase shift keying (8-PSK) for Enhanced Data rates for Global Evolution (EDGE), etc. GMSK is a continuous phase modulation protocol whereas 8-PSK is a digital modulation protocol. A transmitter unit (TMTR) 232 conditions (e.g., filters, amplifies, and upconverts) the modulated signal and generates an RF modulated signal, which is transmitted via an antenna 234.

At receiver 250, an antenna 252 receives RF modulated signals from transmitter 218 and other transmitters. Antenna 252 provides a received RF signal to a receiver unit (RCVR) 254. Receiver unit 254 conditions (e.g., filters, amplifies, and downconverts) the received RF signal, digitizes the conditioned signal, and provides samples. A demodulator 260 processes the samples as described below and provides demodulated data. A receive (RX) data processor 270 processes (e.g., deinterleaves and decodes) the demodulated data and provides decoded data. In general, the processing by demodulator 260 and RX data processor 270 is complementary to the processing by modulator 230 and TX data processor 220, respectively, at transmitter 218.

Controllers/processors 240 and 280 direct operation at transmitter 218 and receiver 250, respectively. Memories 242 and 282 store program codes in the form of computer software and data used by transmitter 218 and receiver 250, respectively.

Figure 3:
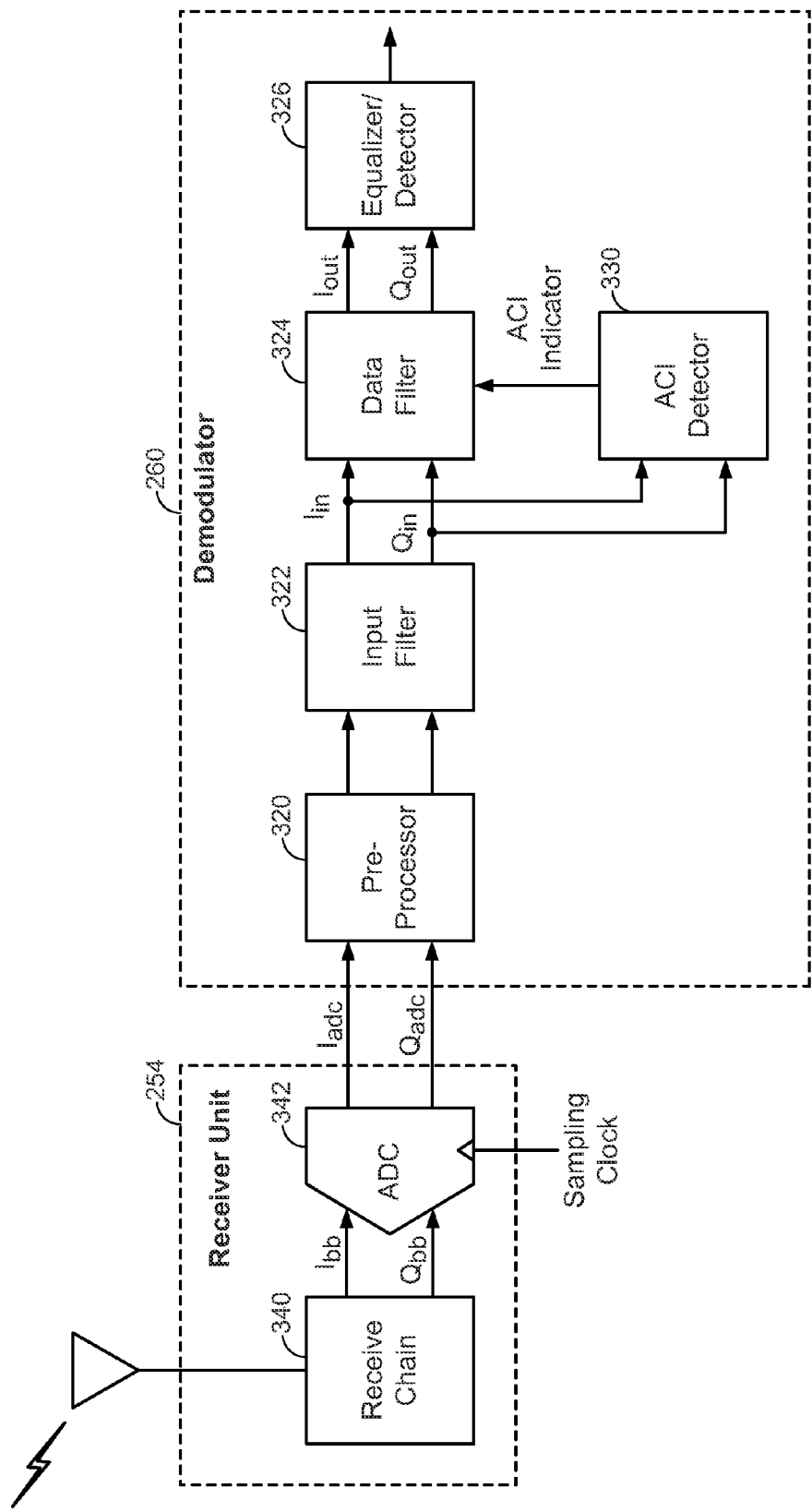
FIG. 3 shows a block diagram of a design of a receiver unit and demodulator at a receiver.

FIG. 3 shows a block diagram of a design of a receiver unit 254 and a demodulator 260 at a receiver 250. Within receiver unit 254, a receive chain 340 processes the received RF signal and provides I and Q baseband signals, which are denoted as $I_{bb}$ and $Q_{bb}$. Receive chain 340 may perform low noise amplification, analog filtering, quadrature downconversion, etc. An analog-to-digital converter (ADC) 342 digitizes the I and Q baseband signals at a sampling rate of $f_{adc}$ and provides I and Q samples, which are denoted as $I_{adc}$ and $Q_{adc}$. In general, the ADC sampling rate $f_{adc}$ may be related to the symbol rate $f_{sym}$ by any integer or non-integer factor. The I and Q samples from sampled data which can be operated upon in various ways in order to obtain useful information from the sampled data.

Within demodulator 260, a pre-processor 320 performs pre-processing on the I and Q samples from ADC 342. For example, pre-processor 320 may remove direct current (DC) offset, remove frequency offset, etc. An input filter 322 filters the samples from pre-processor 320 based on a particular frequency response and provides input I and Q samples, which are denoted as $I_{in}$ and $Q_{in}$. Filter 322 may filter the I and Q samples to suppress images resulting from the sampling by ADC 342 as well as jammers. Filter 322 may also perform sample rate conversion, e.g., from 24× oversampling down to 2× oversampling. A data filter 324 filters the input I and Q samples from input filter 322 based on another frequency response and provides output I and Q samples, which are denoted as $I_{out}$ and $Q_{out}$. Filters 322 and 324 may be implemented with finite impulse response (FIR) filters, infinite impulse response (IIR) filters, or filters of other types. The frequency responses of filters 322 and 324 may be selected to achieve good performance. In one design, the frequency response of filter 322 is fixed, and the frequency response of filter 324 is configurable.

Adjacent channel interference (ACI) detector 330 receives the input I and Q samples from filter 322, detects for ACI in the received RF signal, and provides an ACI indicator to filter 324. The ACI indicator may indicate whether or not ACI is present and, if present, whether the ACI is due to the higher RF channel centered at +200 KHz and/or the lower RF channel centered at −200 KHz. The frequency response of filter 324 may be adjusted based on the ACI indicator, as described below, to achieve good performance.

An equalizer/detector 326 receives the output I and Q samples from filter 324 and performs equalization, matched filtering, detection, and/or other processing on these samples. For example, equalizer/detector 326 may implement a maximum likelihood sequence estimator (MLSE) that determines a sequence of symbols that is most likely to have been transmitted given a sequence of I and Q samples and a channel estimate.

The Global System for Mobile Communications (GSM) is a widespread standard in cellular, wireless communication. GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 MHz bands (Mobile Station to Base Transceiver Station). For downlink communication, GSM 900 uses 935-960 MHz bands (base station to mobile station). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) entitled "Technical Specification 3rd Generation Partnership Project; Technical Specification Group GSM/EDGE Radio Access Network; Multiplexing and multiple access on the radio path (Release 4)", published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station is assigned one or more carrier frequencies. Each carrier frequency is divided into eight time slots (which are labeled as time slots 0 through 7) using TDMA such that eight consecutive time slots form one TDMA frame with a duration of 4.615 ms. A physical channel occupies one time slot within a TDMA frame. Each active wireless device/user is assigned one or more time slot indices for the duration of a call. User-specific data for each wireless device is sent in the time slot(s) assigned to that wireless device and in TDMA frames used for the traffic channels.

Each time slot within a frame is also referred to as a "burst" in GSM. Each burst includes two tail fields, two data fields, a training sequence (or midamble) field, and a guard period (GP). A burst includes 148 symbols for the tail, data, and midamble fields. No symbols are sent in the guard period. TDMA frames of a particular carrier frequency are numbered and formed in groups of 26 or 51 TDMA frames called multi-frames.

Figure 4A:
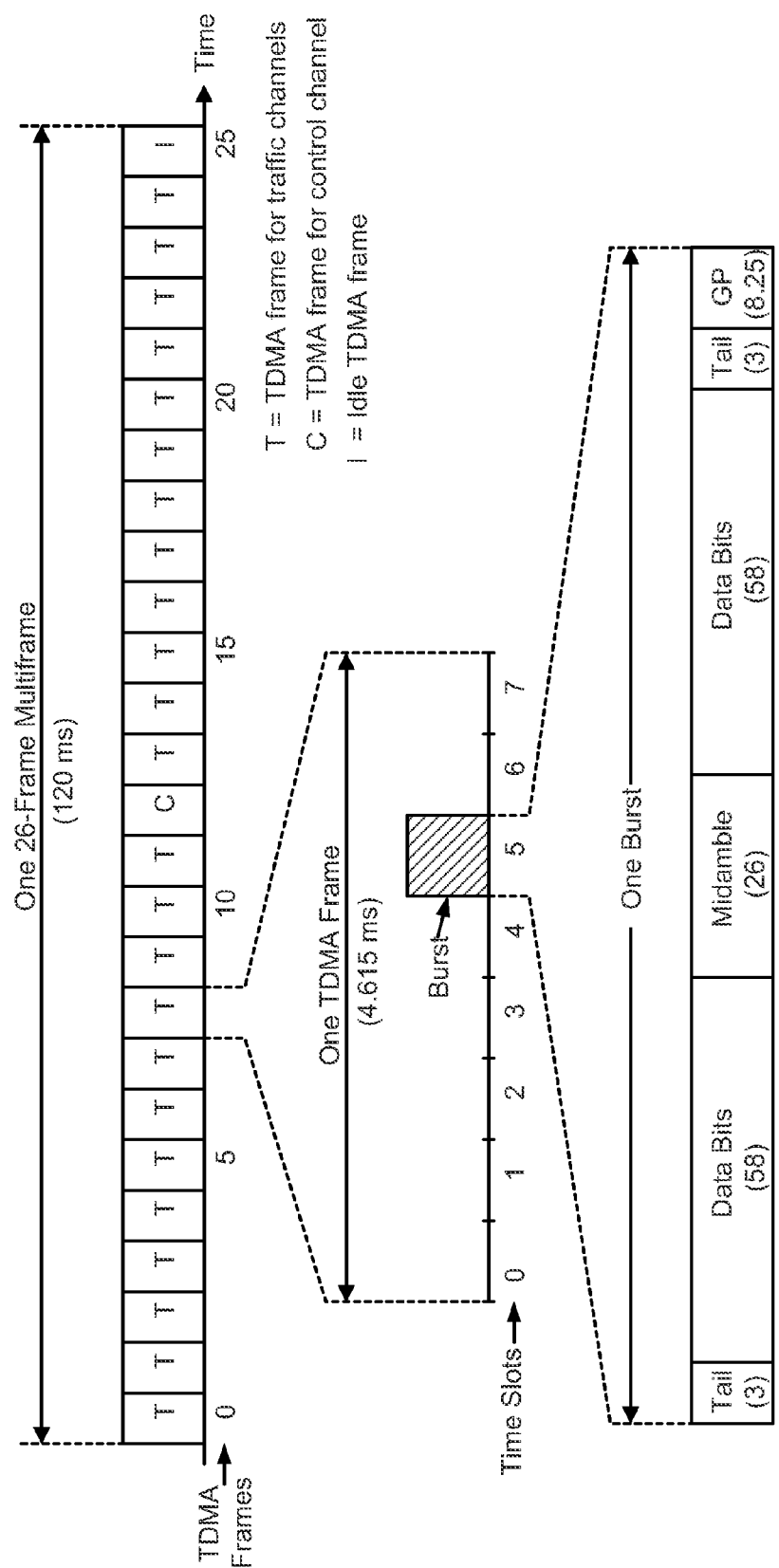
FIG. 4A shows example frame and burst formats in GSM.

FIG. 4A shows example frame and burst formats in GSM. The timeline for transmission is divided into multiframes, as shown, with the number of symbols in each field being shown inside the parentheses. For traffic channels used to send user-specific data, each multiframe in this example includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in idle TDMA frame 25, which is used by the wireless devices to make measurements for neighbor base stations.

For a search in GSM, the wireless device may perform a power scan to measure received power of each radio frequency (RF) channel in a frequency band and may identify strong RF channels. The wireless device may then attempt acquisition on a desired channel by (i) detecting a tone sent on a frequency correction channel (FCCH), (ii) decoding a burst sent on a synchronization channel (SCH) to obtain a BTS identity code (BSIC) for a GSM cell, and (iii) decoding a broadcast control channel (BCCH) to obtain system information.

FIG. 4B illustrates an example FCCH burst. In general, the FCCH is a downlink GSM broadcast channel, and includes a frequency correction burst of all '0' or '1' bits. The FCCH is transmitted by a given base station to provide the signaling information for a mobile station to establish the cell carrier frequency and to enable the mobile station to correct its operating frequency, if necessary. The mobile station and base station each operate according to their own local oscillators (LOs), which are subject to frequency drift and may need to be resynchronized from time to time for proper communication.

The FCCH transmitted by the base station carries a "tone" that allows the mobile station to obtain frequency and coarse timing information for the transmitting cell. More specifically, the FCCH carries a frequency correction burst sent from the base station. The frequency correction burst comprises a signal having a carrier frequency that is frequency-modulated by a single frequency of a quarter of the symbol rate or around 67.7 KHz. The frequency of the transmitted 67.7 kHz tone is based on the local oscillator of the base station. The mobile station derives its own 67.7 kHz nominal frequency using the mobile station's own local oscillator as a reference. There will thus be a frequency error between the mobile station's 67.7 kHz nominal frequency and the transmitted 67.7 kHz tone due to a difference between the local oscillator frequencies of the base station and mobile station. When the frequency correction burst is received by the mobile station, the mobile station detects the tone contained within the received frequency correction burst and estimates the frequency offset of the detected tone relative to the mobile station's own nominal frequency of 67.7 KHz. This estimated frequency offset is used to correct the mobile station's LO.

Figure 5:
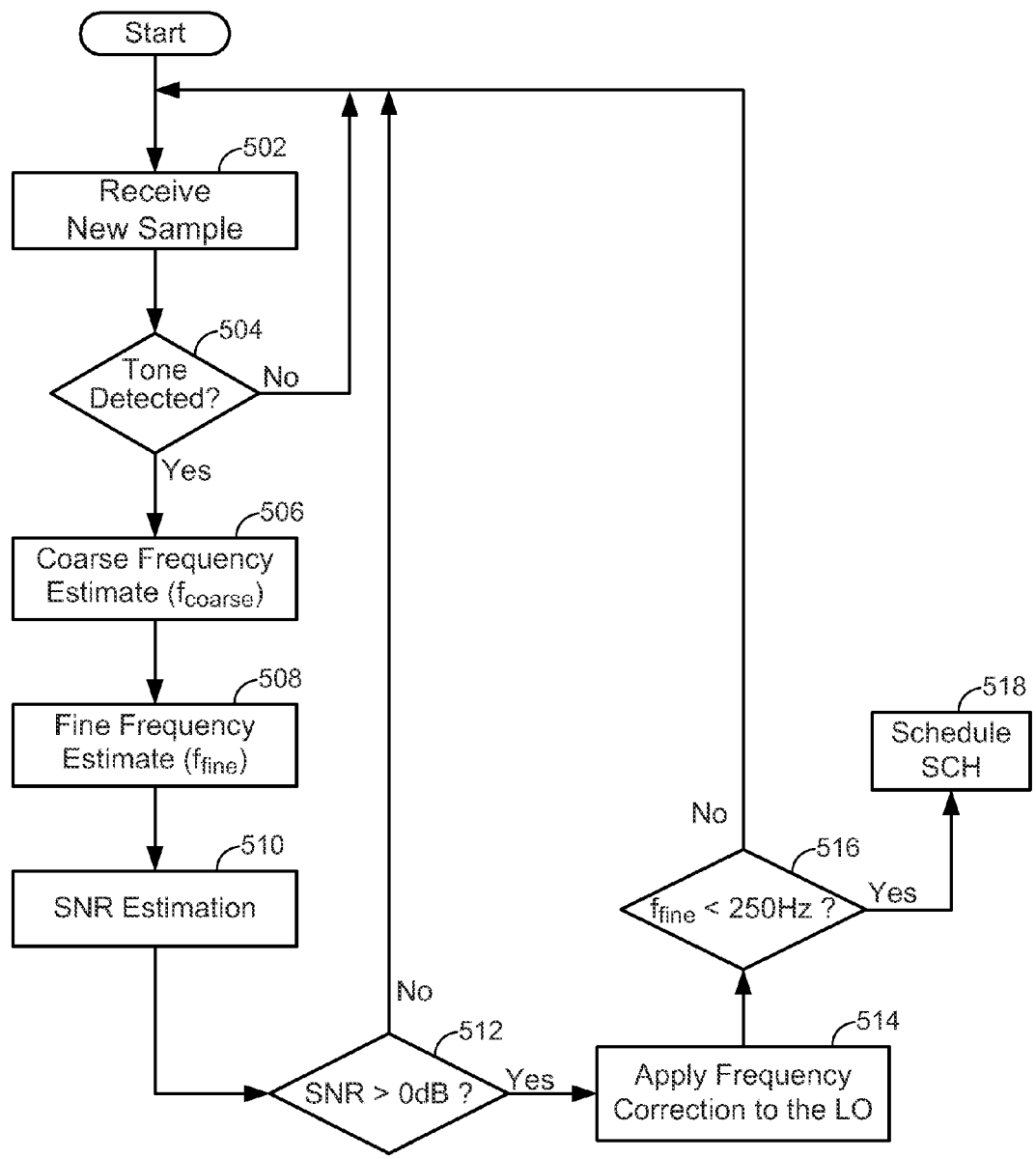
FIG. 5 illustrates an example process for correcting a mobile station's oscillator according to the FCCH.

FIG. 5 illustrates an example process for correcting a mobile station's oscillator according to the FCCH. As shown, the mobile station samples the signal received over the FCCH (block 502) and attempts to detect the above-described tone contained therein (block 504). If the tone is not properly detected, the mobile station simply tries again for the next sample. If the tone is detected, the mobile station proceeds to determining a coarse frequency estimate ($f_{coarse}$) (block 506), a fine frequency estimate ($f_{fine}$) (block 508), and a signal-to-noise ratio estimate (SNR) (block 510) for the offset of the tone from the nominal frequency. The fine frequency estimation may be carried out following the coarse frequency estimation to further refine the frequency estimation in adverse signal conditions. For example, this estimation may take the coarse frequency estimate as a center point, and perform a Discrete-Time Fourier Transform (DTFT) based search within a window of +/−250 Hz to generate the fine estimate $f_{fine}$ of the frequency offset. As long as the estimated SNR exceeds an acceptable threshold (e.g., 0 dB) (block 512), the fine frequency estimate $f_{fine}$ is applied as a correction to the mobile station's LO (block 514). If $f_{fine}$ is large (e.g., above 250 Hz), the mobile station attempts a second corrective iteration using a second sample of the received signal (block 516). Otherwise, the mobile station proceeds to processing on the SCH (block 518) and clock synchronization is deemed complete.

Currently, the acceptable frequency offset for the carrier frequency is specified to be within ±0.1 parts per million (ppm). For a carrier frequency of 1.9 GHz, this frequency offset corresponds to ±190 Hz, which would cause the frequency of the tone to deviate from the nominal 67.7 KHz by a frequency error of 190 Hz. However, in practice it has been observed that a number of mobile networks regularly reach or exceed deviations of ±10.0 ppm, at least temporarily before settling back into the ±0.1 ppm range. These large deviations may be the result of power outages, lightning strikes, or other factors. They are problematic for a number of reasons and may prevent the mobile station from properly camping on a given cell. Currently used algorithms for decoding the FCCH can detect and estimate an FCCH frequency correction tone that has a frequency error as large as ±22.6 kHz. This range is sometimes referred to as the "pull-in" range of the FCCH, and is specified to allow for aging of the LO crystal (e.g., 9.7 ppm) and under the assumption that the BTS frequency source should not deviate more than ±0.1 ppm.

During the coarse frequency estimation step shown by block 506 of FIG. 5, a frequency detection algorithm, such as the Luise-Regiannini (L-R) algorithm, is used to detect the frequency error. Samples of received symbols are processed repeatedly on a burst-by-burst basis. Typically, around 100 samples are taken from the middle portion of the burst. The end portions of the burst are not used initially because the end portions are more subject to channel distortions. The 100 samples used for estimating the coarse frequency estimate are still the same samples but the indices of correlations used in this case are different. A gray zone of frequency error is a range of frequency offsets that are close to the boundary of detection capability, and therefore introduce a degree of uncertainty as to whether they will or will not be detected by the frequency detection algorithm. To accommodate for grey zones, which limit the so-called acquisition pull-in range, a three pass technique is provided herein to parametrically check for three different possibilities during the acquisition process.

Accordingly, the range of the coarse frequency estimate may be improved, which will ultimately result in the widening of the acquisition range overall, by working on the sample set in a different manner, resulting in a wider frequency pull-in range. The number of samples used for estimating the coarse frequency estimate (e.g., 100) remains the same, but the indices (or lags) of correlations used in this case are different. To cater for gray zones, which limit the target acquisition pull-in range, a three pass technique is provided to parametrically check for three different possibilities during the acquisition process. All three checks are mutually exclusive, and the probability of false alarm is substantially reduced.

Accordingly, embodiments herein provide for an improved pull-in range by improving physical layer performance. For example, with reference to FIG. 5, the pull-in range may be improved by widening the range of detectable tones (at block 504) and corresponding coarse frequency estimates (at block 506).

Figure 6:
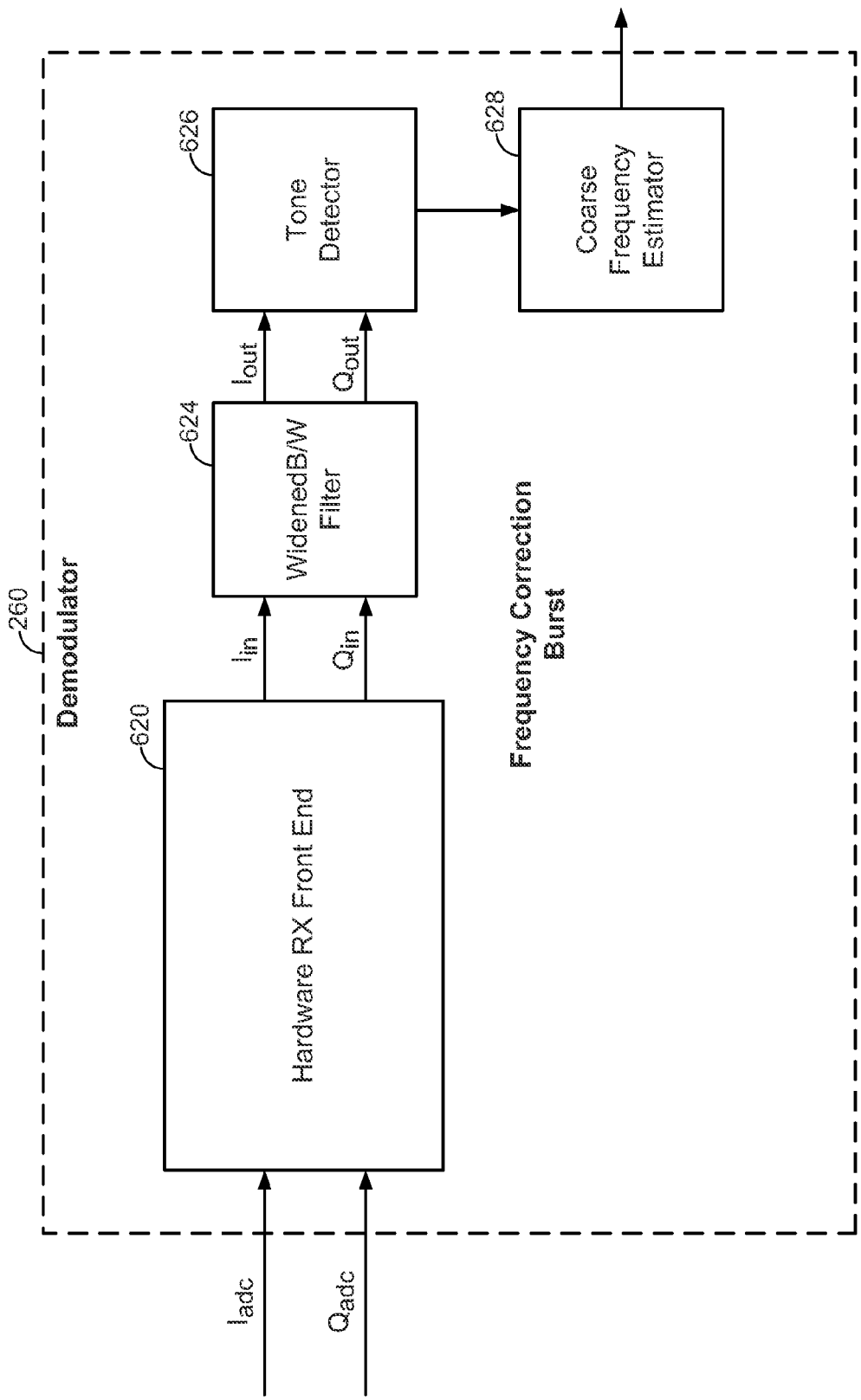
FIG. 6 shows a modified block diagram of a design of a receiver unit and a demodulator at a receiver for improving pull-in range.

FIG. 6 shows a modified block diagram of a design of a demodulator 260 for improving the pull-in range according to an example embodiment. As shown, the demodulator 260 is modified from the demodulator 260 shown in FIG. 3 for detecting and decoding a wider range of frequency offsets $f_o$ on the FCCH. In this regard, a widened baseband filter 624 is provided, following front-end receiver hardware 620, that feeds a tone detector 626 and a course frequency estimator 628.

Conventionally, the received FCCH signal is passed through a relatively narrow baseband filter with a cut-off frequency or 3 dB bandwidth attenuation of about 83 KHz, which is selected to meet the standard GSM frequency offset $f_o$ specification of ±22.6 KHz about the nominal frequency of 67.7 KHz. However, the conventional front-end filtering is not able to handle the larger frequency errors often seen in the real world as discussed above, because these frequencies are attenuated by the conventional firmware filter to the point of becoming unusable. This is especially true for offsets that are large and positive. FCCH tone detection and decoding is not symmetric for large frequency offsets $f_o$ at low SNRs due to the nature of the low-pass filter employed. For example, a frequency offset of +20 KHz (i.e., a tone at 87.7 KHz) will be attenuated more (e.g., 4-5 dB) than a frequency offset of −20 KHz (i.e., a tone at 47.7 KHz) as the passed signal energy is rolled off at higher frequencies.

Figure 7:
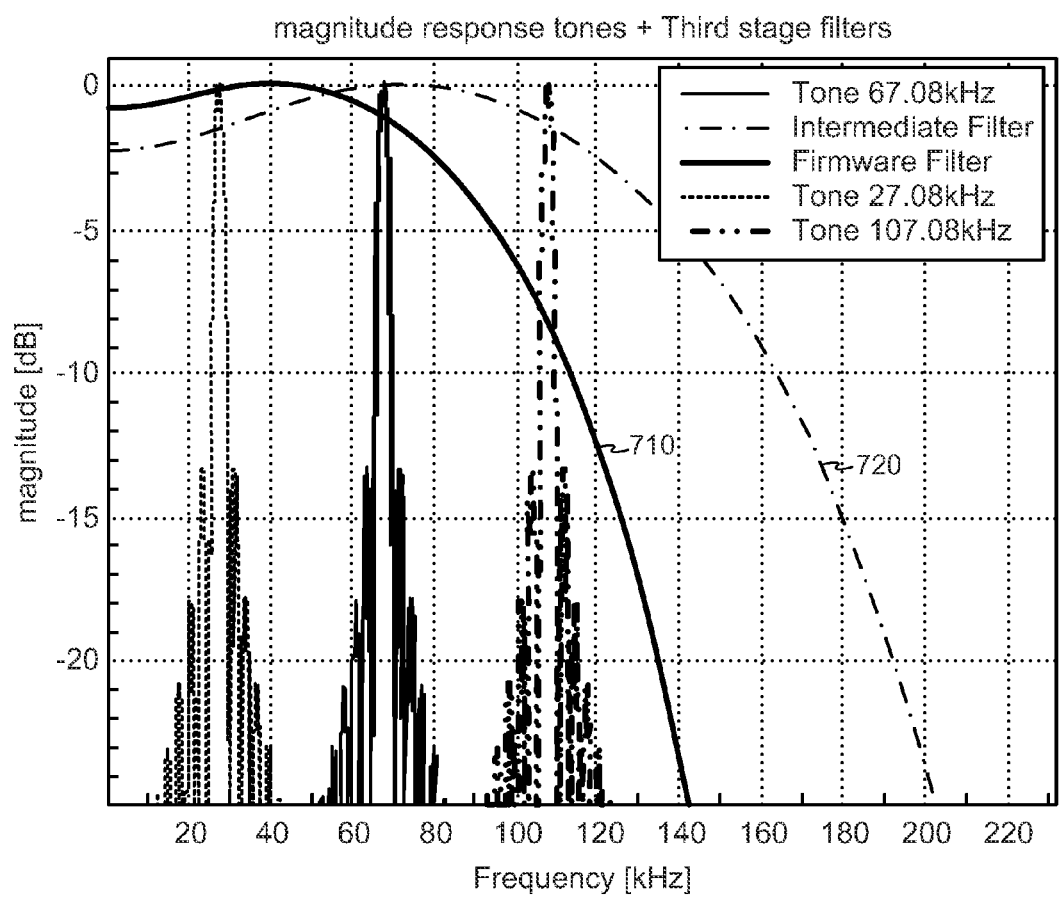
FIG. 7 illustrates the effect of low-pass filters on various received tone frequencies.

FIG. 7 illustrates the effect of low-pass filters on various received tone frequencies. In particular, a near ideal tone of 67.08 KHz is shown along with offset tones of ±40 KHz (i.e., one tone at 27.08 KHz and another tone at 107.08 KHz). Two filters, including a curve for a conventional firmware filter 710 and a curve for an intermediate filter 720 according to one embodiment, are applied to the three tones. As illustrated, the conventional firmware filter significantly attenuates the positive offset tone while the intermediate filter allows this tone to be substantially passed, and subsequently processed. In the particular design shown here, an intermediate filter with a 3 dB attenuation bandwidth of 124 KHz is selected for the widened baseband filter 624. In this design, the widened baseband filter 624 provides a widened pull-in range on the positive side of about +43 KHz of frequency offset, which provides relatively low asymmetry over the frequency range of interest while still filtering out unwanted signals and noise outside of this range.

It will be appreciated that the widened baseband filter 624 may be a digital filter, which can be changed based on the type of processing to be carried out. For FCCH detection, the widened baseband filter 624 may be advantageous for the reasons discussed herein. Once FCCH has been detected, however, the filter may be replaced by a narrower one, such as in the configuration of FIG. 3 or the like, for subsequent communication channel processing.

As discussed above, the FCCH tone is detected by sampling and analyzing a signal received over the FCCH that contains the tone. For example, the received signal r at a given sample k can be represented by a signal model as:

$$r_k = \underline{h}^T \underline{s}_k + n_k, \quad (1)$$

where $r_k$ is the $k^{th}$ received sample, $\underline{h}$ is a channel vector, $\underline{s}_k$ is a transmitted data vector, and $n_k$ is a noise factor for the $k^{th}$ received sample.

The data for the FCCH is conventionally represented by an all "1" or "0" sequence, which when Gaussian Minimum Shift Keying (GMSK) modulated turns into a tone at 67.7 KHz. Accordingly, the transmitted data s can be approximated as follows:

$$s_l = \exp(jl\pi/2 + \phi), \quad (2)$$

where l is an integer between zero and a window size L used for the sampling, and $\phi$ is an initial phase offset.

Thus, for a given frequency offset $f_o$ on the FCCH tone, using equation (2) in equation (1), the received samples $r_k$ may be expressed as:

$$r = \underline{h}^T \begin{bmatrix} e^{j(k(\frac{\pi}{2}+\theta)+\phi)} & e^{j((k+1)(\frac{\pi}{2}+\theta)+\phi)} & \cdots & e^{j((k+L)(\frac{\pi}{2}+\theta)+\phi)} \\ e^{j((k-1)(\frac{\pi}{2}+\theta)+\phi)} & e^{j(k(\frac{\pi}{2}+\theta)+\phi)} & \cdots & e^{j((k+L-1)(\frac{\pi}{2}+\theta)+\phi)} \\ \vdots & \vdots & \vdots & \vdots \\ e^{j((k-v)(\frac{\pi}{2}+\theta)+\phi)} & e^{j((k-v+1)(\frac{\pi}{2}+\theta)+\phi)} & \cdots & e^{j((k+L-v)(\frac{\pi}{2}+\theta)+\phi)} \end{bmatrix} + \underline{n}, \quad (3)$$

where $\theta = 2\pi f_o T$, with T being the symbol period, $\underline{r} = [r_k, r_{k+1}, \ldots, r_{k+L}]$, and $\underline{n} = [n_k, n_{k+1}, \ldots n_{k+L}]$.

From equation (3), it can be seen that:

$$r_l = e^{(jl(\frac{\pi}{2}+\theta)+\phi)}(h_0 + h_1 e^{-j(\frac{\pi}{2}+\theta)} + \ldots + h_v e^{-jv(\frac{\pi}{2}+\theta)}) + n_l \quad (4)$$

$$= e^{(jl(\frac{\pi}{2}+\theta)+\phi)}(\tilde{h}_0 + \tilde{h}_1 + \ldots + \tilde{h}_v) + n_l,$$

$$r_l = \tilde{\alpha} e^{(jl(\frac{\pi}{2}+\theta)+\phi)} + n_l,$$

where $\tilde{\alpha} = (\tilde{h}_0 + \tilde{h}_1 + \ldots + \tilde{h}_v)$.

After rotation by $\pi/2$ at the receiver to convert into a binary phase shift keying (BPSK) signal, the received signal may be reduced to the following:

$$\tilde{r}_l = \tilde{\alpha} e^{(jl\theta + \phi)} + \tilde{n}_l. \quad (5)$$

Returning to FIG. 6, the tone detector 626 is configured to detect a single tone or harmonic from the filtered received signal. For example, the tone detector 626 may use a 1st order linear predictive coding (LPC) filter to form a coherent sum of incoming data, such as according to the following function:

$$G(z) = 1 + \left(\frac{R^*(1)}{R(0)}\right) z^{-1}, \quad (6)$$

where R(1) and R(0) are correlation values. R(0) represents an autocorrelation value from multiplying the received sequence of symbols by itself. Each symbol of the sequence is multiplied by itself, and the resulting products are summed to produce the coherent sum. R(1) represents a cross correlation value from multiplying the received sequence of symbols by a shifted version of the sequence to produce a product. The products are then summed to produce the coherent sum. The correlation is performed repetitively on a burst-by-burst basis. The ratio of R*(1)/R(0) is used to declare a tone "flag" (i.e., an indication of whether the tone is present or not). The ratio starts off very small or close to zero, then passes a determined correlation threshold (e.g., 0.40) indicating the start of the tone, and falls back down below the correlation threshold to indicate the end of the tone.

Figure 8:
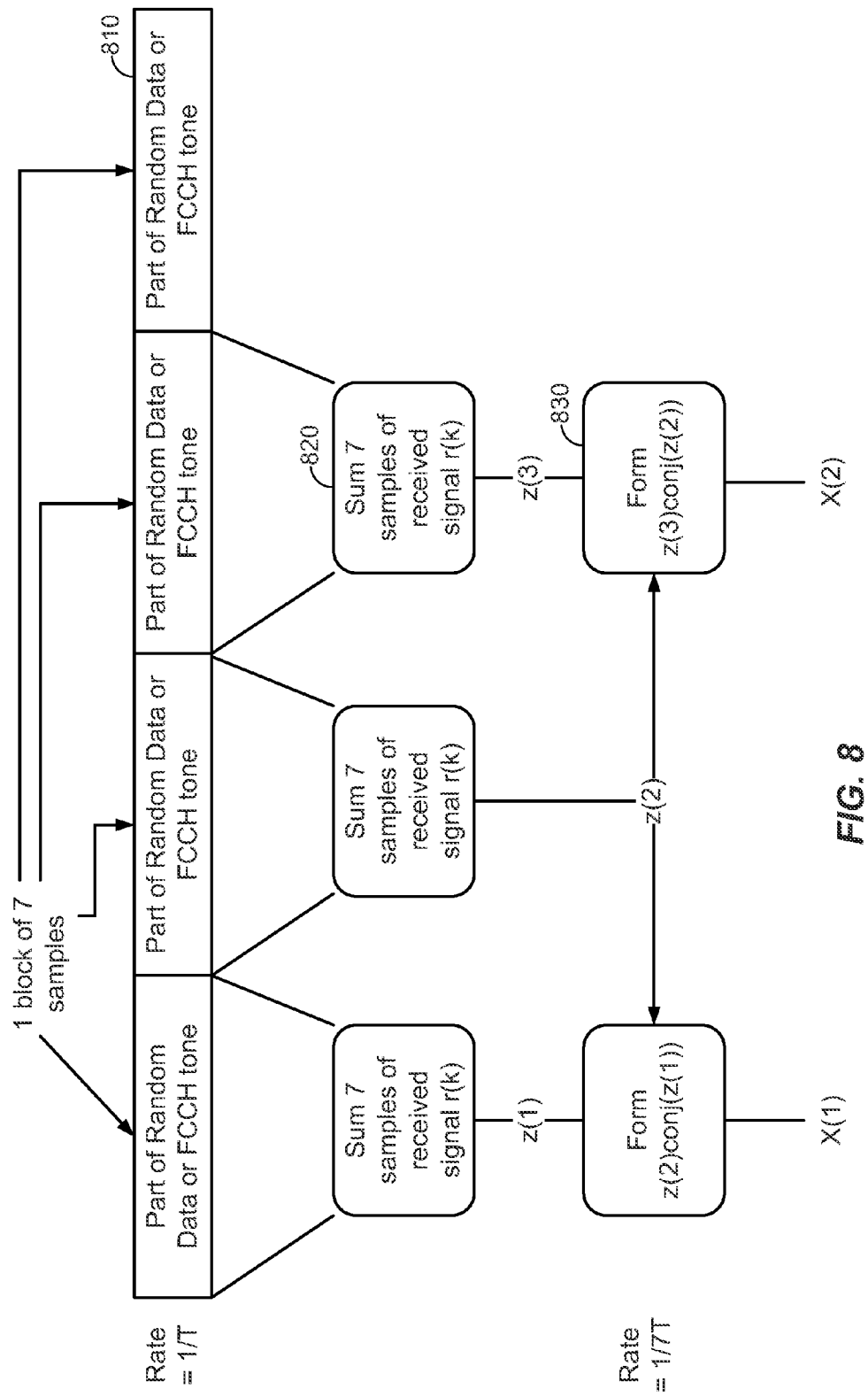
FIG. 8 illustrates the operation of an FCCH detector according to an embodiment using LPC filtering.

FIG. 8 illustrates the operation of the tone detector 626 according to an example embodiment that uses the above LPC filtering. As shown, incoming data is divided into a number of blocks 810 corresponding to a data window of a given sample size (conventionally, the number N of sampled data symbols used per block is N=7). The samples of each block are summed 820 together to produce a first coherent sum z(1), a second coherent sum z(2), and a third coherent sum z(3). Then, the first and second coherent sums z(1) and z(2) are correlated 830 to produce a first correlation result x(1). The second and third coherent sums z(2) and z(3) are also correlated to produce a second correlation result x(2).

The signal containing the FCCH tone may also be represented exponentially as follows:

$$y_k = \sum_{l=0}^{N-1} \tilde{r}_{l+Nk} \quad (7)$$

$$= \sum_{l=0}^{N-1} (\tilde{\alpha} e^{j(l+kN)\theta+\phi)} + \tilde{n}_{l+kN})$$

$$= \tilde{\alpha} e^{j(kN\theta+\phi)} \sum_{l=0}^{N-1} e^{jl\theta} + v_k$$

$$= \tilde{\alpha} e^{j(kN\theta+\phi)} e^{j(N-1)\theta/2} \frac{\sin\left(\frac{N\theta}{2}\right)}{\sin\left(\frac{\theta}{2}\right)} + v_k,$$

where $k = 0, 1, \ldots, \left\lfloor \frac{L}{N} \right\rfloor - 1$, and where $v_k$ is additive white Gaussian noise $N(0, N\sigma^2)$.

From this, it can be seen that the coherent sum provides a gain in SNR ($\rho$) that is dependent on the number of samples per block N:

$$\rho_{coherent} = \frac{\rho}{N}\left(\frac{\sin\left(\frac{N\theta}{2}\right)}{\sin\left(\frac{\theta}{2}\right)}\right)^2 \quad (8)$$

where $\rho = \frac{\|\tilde{\alpha}\|^2}{\sigma^2}$.

Figure 9:
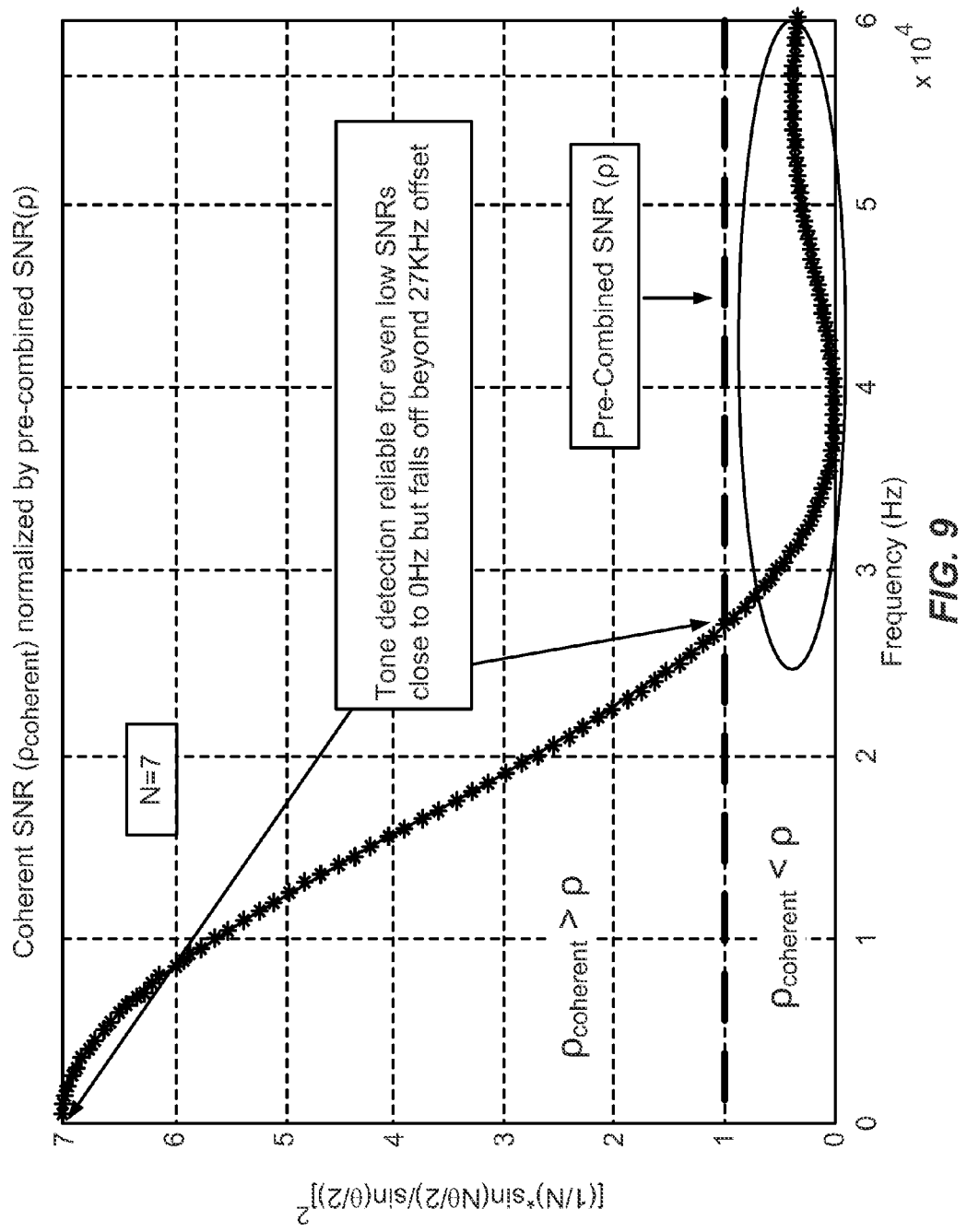
FIG. 9 illustrates a $\rho_{coherent}$ spread over an offset frequency range for a conventional implementation where the number N of samples used per block is N=7.

FIG. 9 illustrates the $\rho_{coherent}$ spread over the offset frequency range for a conventional implementation where the number N of samples used per block is N=7. The graph shows that when the tone frequency offset (horizontal axis) is zero (left-hand vertical axis), the SNR has a relative value of 7 (i.e., the SNR gain is 7), corresponding to the number of symbol samples per block. The gain decreases as the tone frequency offset increases. When the frequency offset is 27 KHz, the gain is 1, i.e. the ratio ($\rho_{coherent}/\rho$) is unity. When the tone frequency offset is 38.7 KHz, the gain is zero. As can be seen here, no tones will be detected for a 38.7 KHz offset. Also from the figure, it can be seen that the tone detection falls off beyond 27 KHz for low SNRs.

Figure 10:
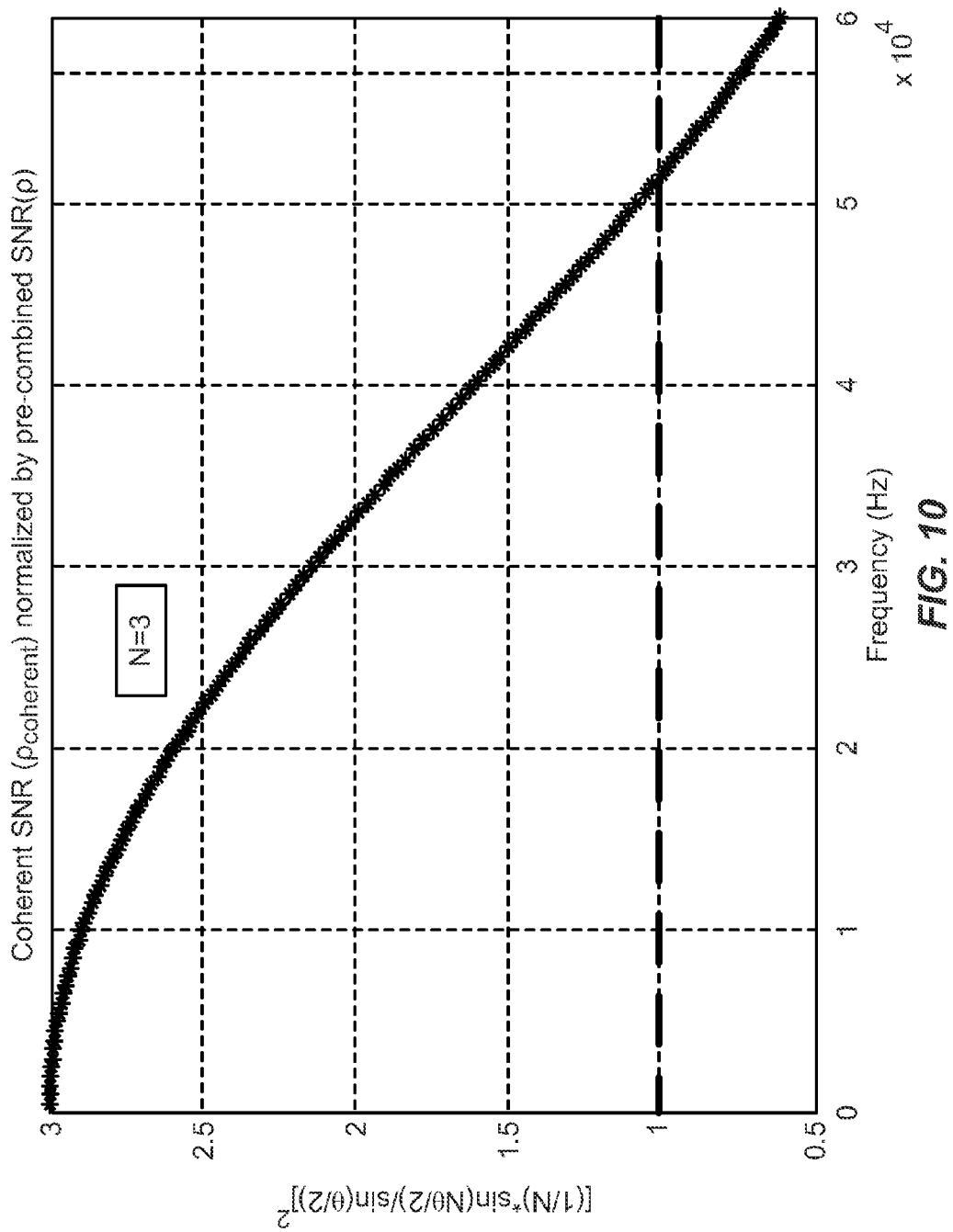
FIG. 10 illustrates the use of N=3 samples per block by an FCCH detector to widen the detectable range of tone offsets.

By contrast, FIG. 10 illustrates the use of, for example, N=3 samples per block by the FCCH tone detector 626 to widen the detectable range of tone offsets. Using a smaller number of samples per block increases the correlation gain for large frequency offsets by enabling more blocks to be used in the calculation. This gain is reduced at the expense of the gain for lower frequency offsets, as can be seen in comparison with FIG. 9, but this reduction is not so severe as to prevent detection. Loss in coherent SNR for N=3 as compared to N=7 is more than compensated by the increase in number of coherently summed samples, and hence, better correlations as well as better indexing. Better indexing implies less ambiguity in finding the correct tone start and end.

While detecting the presence of a tone and estimating the frequency thereof, the mobile station may also estimate the starting or ending time of the tone to provide a coarse timing of the frequency burst This coarse timing is used to locate a synchronization burst, called an SCH burst, which follows the detected tone. The synchronization burst is used to derive a fine tuned timing to schedule the following normal burst processing. The SCH also provides a base station ID.

In conventional course frequency estimation, the frequency offset $f_0$ that can be detected using these conventional techniques is limited by the number of correlations M according to the following equation:

$$f_0 \leq \frac{F_s}{(M+1)}, \quad (9)$$

where $F_s$ is the sampling frequency. In the conventional GSM system, M=11 and $F_s$=270.833 KHz, which leads to the maximum currently detectable $f_0$ of approximately 22.6 KHz, as discussed above.

Course frequency estimation may be expanded according to various embodiments disclosed herein by modifying the estimated frequency offset $\hat{f}$ equation $$\hat{f} = \frac{1}{\pi T(M+1)} \arg\left(\sum_{k=1}^{M} R(k)\right)$$

to skip samples in the sum, taking only odd numbered samples, for example, as follows:

$$\hat{f} = \frac{1}{2\pi T} \arg\left(\sum_{k=-P}^{P} R(2k+1)\right) \quad (10)$$

$$= \frac{1}{2\pi T} \arg\left(\sum_{k=-P}^{P} (\|\tilde{\alpha}\|^2 e^{j(2k+1)\theta})\right)$$

$$= \frac{1}{2\pi T} \arg\left(\|\tilde{\alpha}\|^2 e^{j\theta} \frac{\sin((2P+1)\theta)}{\sin(\theta)}\right).$$

Given that $$|\theta| \leq \frac{\pi}{2} \text{ and } \theta \neq \frac{n\pi}{(2P+1)},$$

to avoid the sign flip of the sinc function, and using the arctangent function by inputting the ratio of imaginary parts to real parts, it can be seen that $f_0$ is now bounded as follows:

$$-\frac{F_s}{4} \leq f_0 \leq \frac{F_s}{4}, \text{ and} \quad (11)$$

$$f_0 \neq f_{null} = \frac{nF_s}{2(2P+1)}. \quad (12)$$

In this way, the estimated frequency offset $\hat{f}$ avoids using the noise term that corresponds to an index of 0, removes the dependency on the number of samples M from the estimated frequency offset $\hat{f}$ equation entirely, and provides a wider range of detectable frequency offsets.

Figure 11:
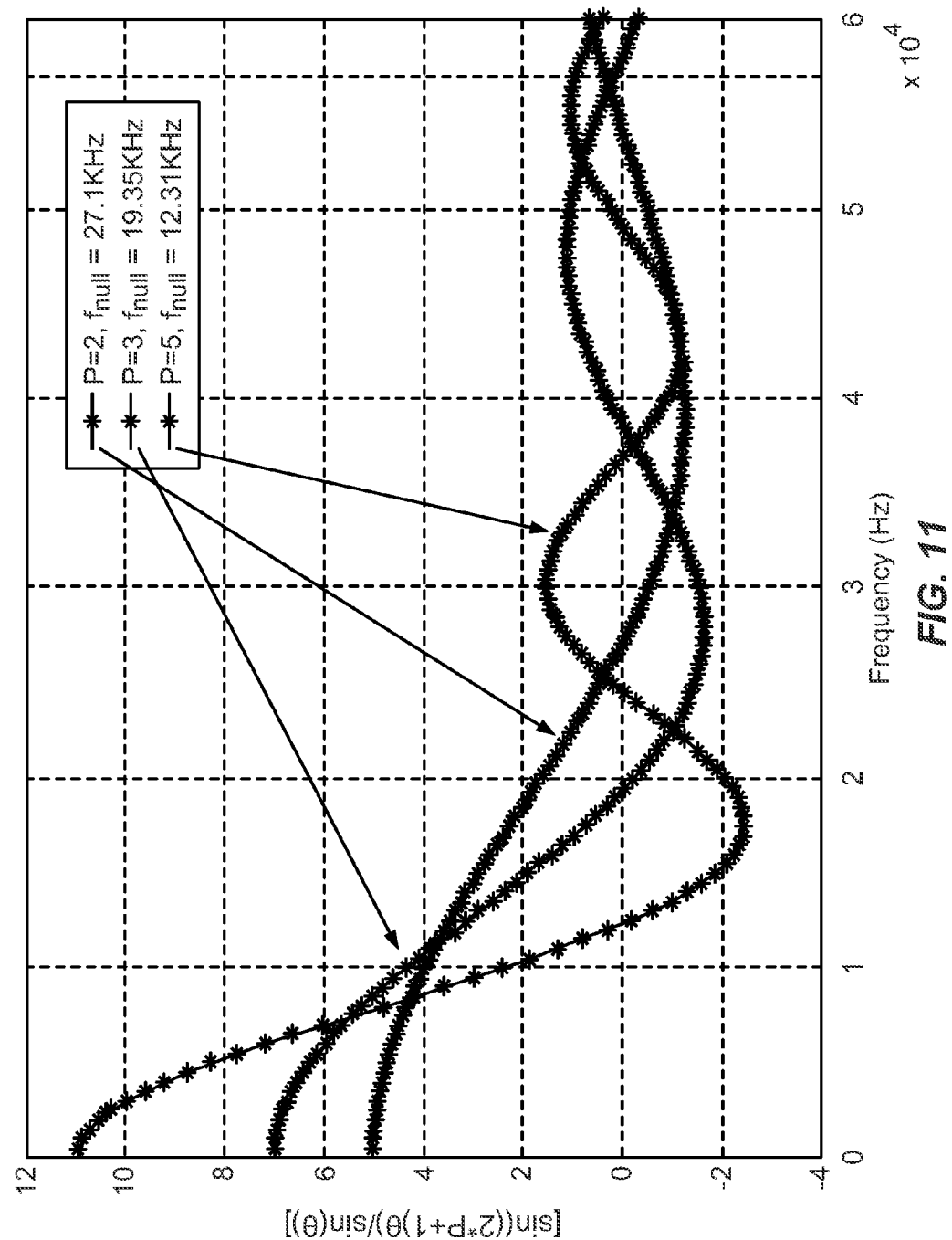
FIG. 11 illustrates a modified frequency offset $\hat{f}$ for several values of P.

FIG. 11 illustrates the modified frequency offset $\hat{f}$ equation (10) for several values of P. As shown, there is a "gray zone" of uncertainty around $f_{null}$ where the algorithm may struggle to acquire for moderate and low SNRs. Accordingly, there is an SNR tradeoff to maintain adequate averaging over the desired wider range.

To remove such gray zones from the desired offset range (e.g., +/−50 KHz) and provide more consistent and accurate FCCH frequency estimation for large frequency offsets across varying SNRs, techniques are provided herein to further use a "multipass" algorithm to help center the above-described waveform over different sets of frequencies offset from one another by a phase $\phi_n$, according to the following equation:

$$\hat{f}(\phi_n) = \frac{1}{2\pi T}\left(\arg\left(\|\tilde{\alpha}\|^2 e^{j(\theta-\phi_n)}\frac{\sin((2P+1)(\theta-\phi_n))}{\sin(\theta-\phi_n)}\right) + \phi_n\right), \quad (13)$$

where $\phi_n = \frac{n\pi}{(2P+1)}$, $n \in \{0, 1, -1\}$.

This multipass algorithm does not require the original samples to be rotated by $\phi_n$, only the final correlations, such that:

$$R(2k+1,\phi_n) = R(2k+1)e^{-j(2k+1)\phi_n}. \quad (14)$$

Figure 12:
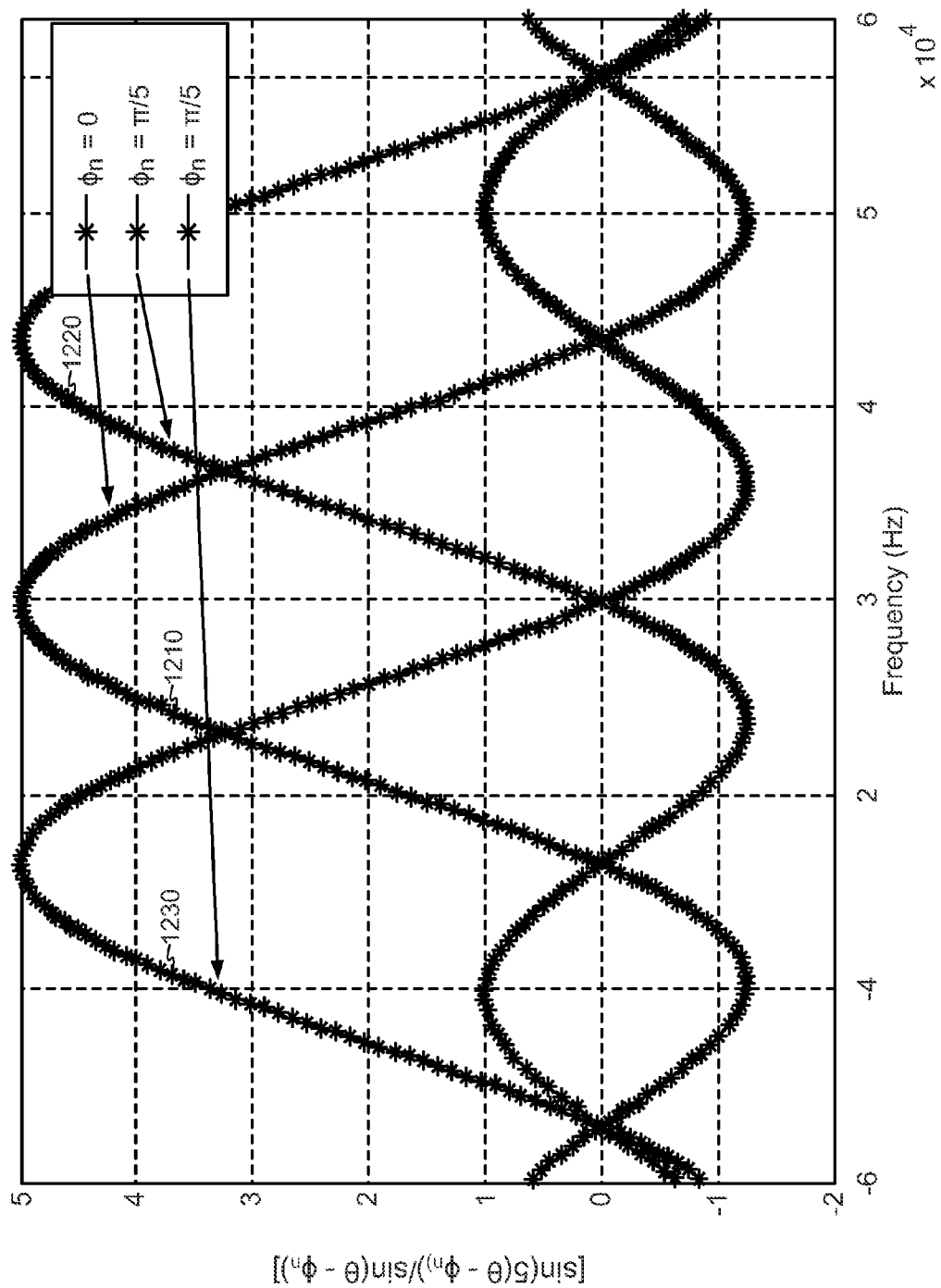
FIG. 12 illustrates a frequency offset $\hat{f}$ for several phase offsets $\phi_n$.

FIG. 12 illustrates the frequency offset $\hat{f}$ equation (13) above for several values of phase $\phi_n$ offsets. In particular, an offset of $+\pi/5$ (1220) shifts the central lobe of the function $\hat{f}$ to the right and an offset of $-\pi/5$ (1230) shifts the central lobe to the left of the central lobe having no phase offset (1210). It will be appreciated that this shifting widens the range of the frequency error estimate. Further, it will be appreciated that the various embodiments are not limited to a specific phase offset value. However, offset values for $\phi_1$ and $\phi_2$ of plus and minus $\pi/5$ respectively have been found to be advantageous when P=2. For a given value of P, offset values of plus and minus $\pi/(2P+1)$ have been found to be advantageous. When these offset values are chosen, the peak of the central lobe of the function $\hat{f}$ when no offset is applied is located at the same frequency as a null or zero-crossing frequency of the function $\hat{f}$ when an offset of $\pi/(2P+1)$ is applied, and the combined amplitudes of the function for all offsets are relatively high over the frequency range of interest (i.e., the error bandwidth). This is represented by the combined region of frequencies under the intersecting central lobes for different offsets (one central lobe for each curve in the example illustrated in FIG. 12).

Figure 13:
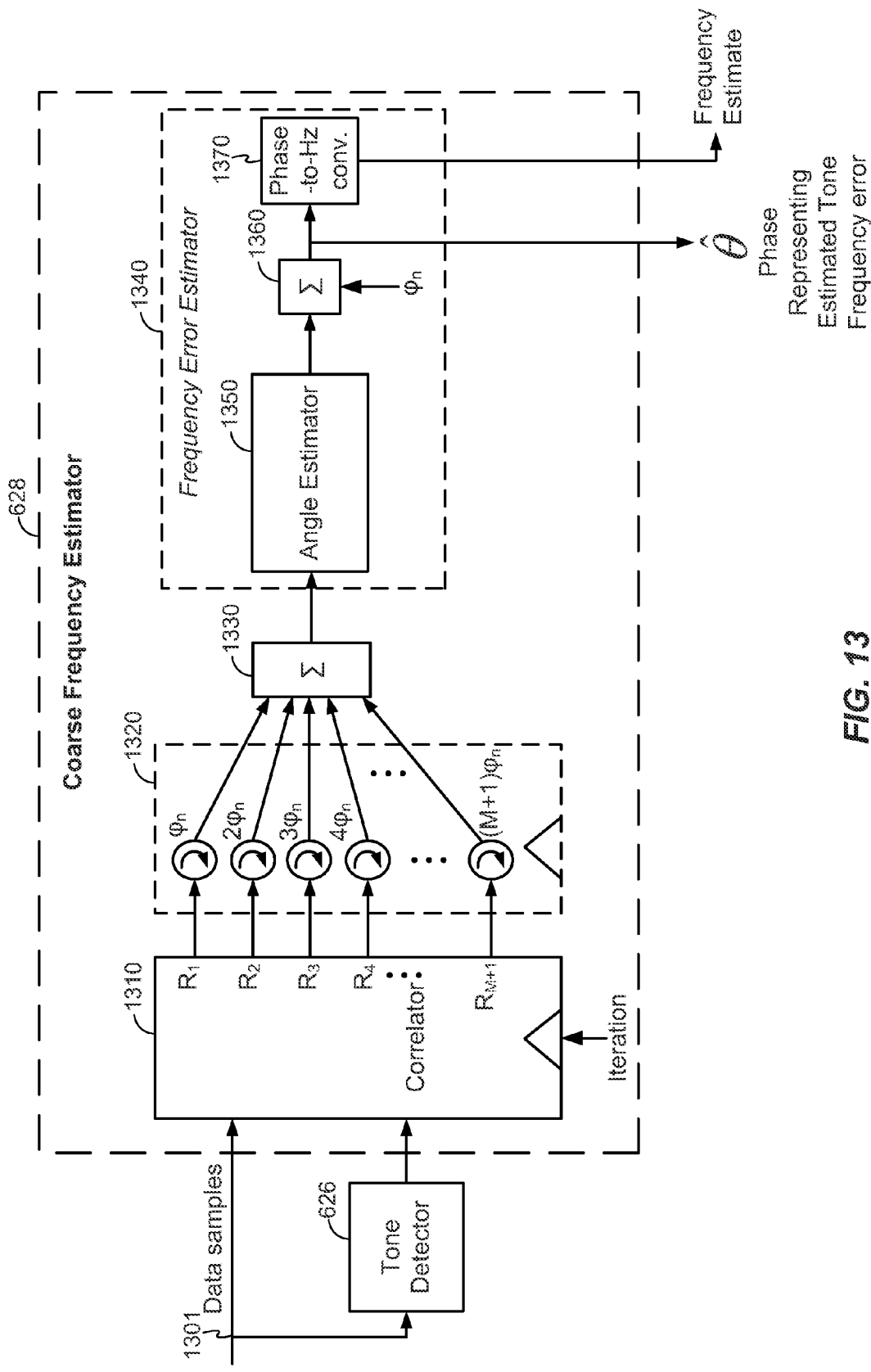
FIG. 13 shows a block diagram of an acquisition enhanced frequency estimation system.

FIG. 13 shows a block diagram of an acquisition enhanced frequency estimation system, including a more detailed view of the coarse frequency estimator 628 shown in FIG. 6, for estimating a frequency error of a tone in a stream of data symbols. A stream of data symbols in the form of signal samples 1301 is provided to a tone detector 626 and to a correlator 1310. The signal samples represent signals including a tone signal that occupies an error bandwidth within which the tone frequency may lie.

When a tone is detected by the tone detector 626, the correlator 1310 auto-correlates the signal samples to produce a number of complex correlation values L (shown as $R_1$ to $R_{M+1}$), and selects a portion of the L complex correlation values corresponding to a range of odd correlation lags (e.g., 1, 3, 5). A phase rotator 1320 applies a phase offset $\phi_n$ to the selected complex correlation values to produce offset complex correlation values representing signals that occupy a bandwidth equal to the error bandwidth offset by an offset frequency. A smart summer 1330 sums the offset complex correlation values to produce a complex sum.

A frequency error estimator 1340 is configured to determine a frequency error using the complex sum. The frequency error estimator 1340 may include an angle estimator 1350 for calculating the argument of the complex sum, a phase adder 1360 to remove the phase offset $\phi_n$ previously applied at the phase rotator 1320 and produce a computed phase $\hat{\theta}$ representing a frequency error of the tone, and a phase to frequency converter 1370 to convert the computed phase $\theta$ to an estimate $\hat{f}$ of the frequency error of the tone.

Figure 14:
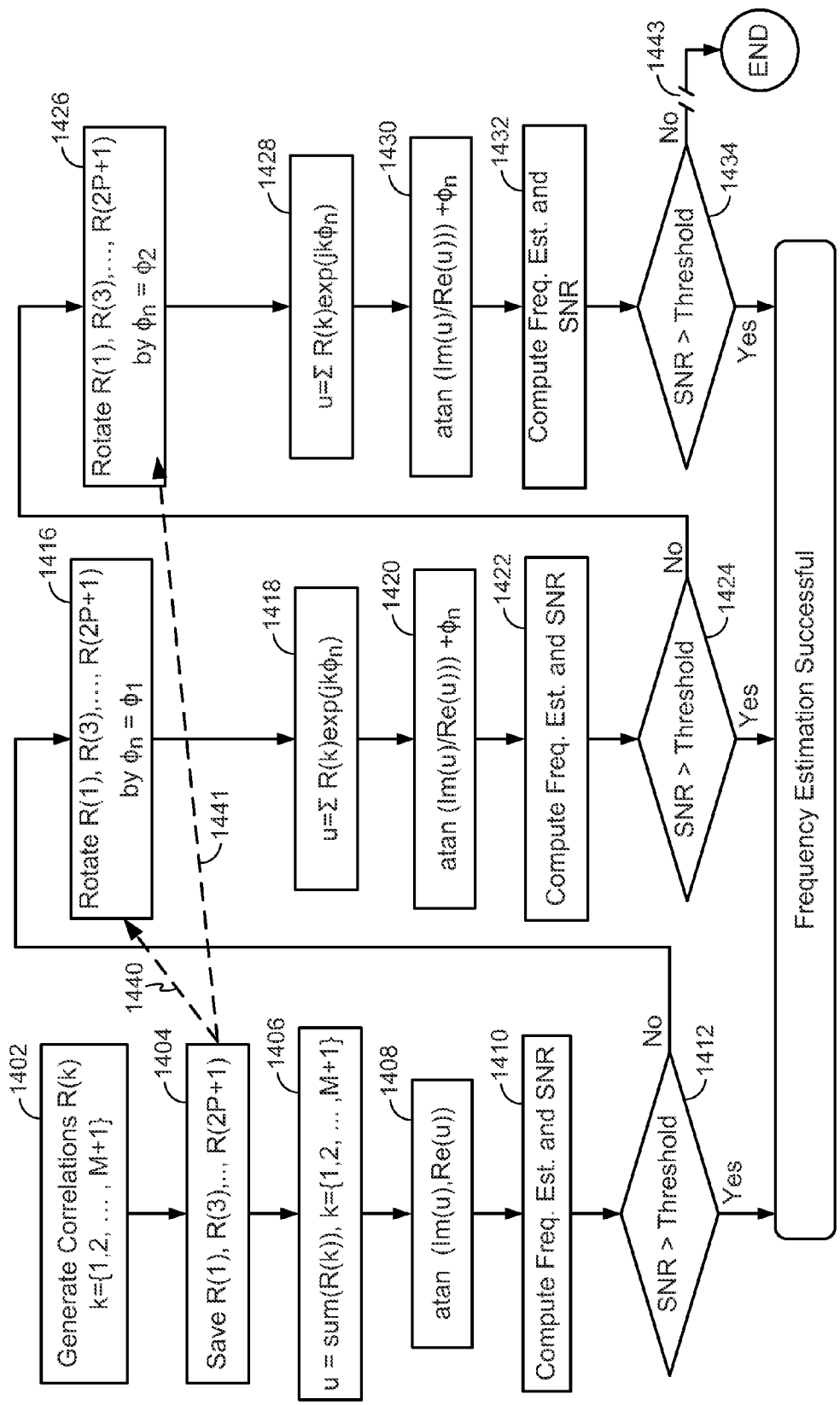
FIG. 14 is a flow diagram illustrating an algorithm for determining a frequency estimate in the manner described below according to an example embodiment.

FIG. 14 is a flow diagram illustrating a multipass frequency estimation algorithm with the potential for three or more iterations for determining the frequency estimate in the manner described above according to an example embodiment. As shown, when a tone is detected, a number of correlations R(k) for a stream of symbol samples (e.g., 100 samples) is generated (block 1402). The index k represents a lag value up to k=M+1. A subset of correlations (in this example, odd correlation lags R(1), R(3), and R(5) or simply correlations R(1), R(3), and R(5)) are saved for future iterations (block 1404). The correlation values are summed over all k (1 to M+1) to produce a complex sum u (block 1406). The argument of the complex sum is then computed (e.g., using an atan function) to determine its phase (block 1408). The phase is converted into a frequency value and the SNR computed by rotating the samples by the determined phase value (block 1410). If the computed SNR is above a given threshold (e.g., 0 dB), the frequency estimation of the tone is deemed successful (block 1412). Otherwise, one or more subsequent iterations are performed using the saved correlations R(1), R(3), and R(5) and a phase offset.

For example, in the embodiment shown in FIG. 14, a second iteration is initiated by applying a phase offset or rotation of $\phi_n=\phi_1$ to the saved correlations R(1), R(3), and R(5) (block 1416). The rotated correlation values are then summed (block 1418), the phase is computed and adjusted for the artificial offset $\phi_n$ (block 1420), and the corresponding SNR is computed (block 1422), similar to the corresponding operations for the first iteration. If the computed SNR is above the threshold, the frequency estimation of the tone is now deemed successful (block 1424). Otherwise, a third iteration is initiated with a phase offset of $\phi_n=\phi_2$ (block 1426), the rotated correlation values are summed (block 1428), the phase is computed and adjusted for the artificial offset $\phi_n$ (block 1430), and the corresponding SNR is computed (block 1432).

If the computed SNR is above the threshold, the frequency estimation of the tone is now deemed successful (block 1434). Otherwise, processing may end. In some embodiments, such as when a multithreaded processor is used, the processing for the different offsets of $\phi_n=0$, $\phi_1$, and $\phi_2$ may be performed in parallel, as indicated in FIG. 14 by the dashed lines 1440, 1441. More than three iterations may be performed as indicated by broken line 1443 to the right of decision block 1434. Each iteration corresponds to a different value of phase offset $\phi_n$.

Figure 15:
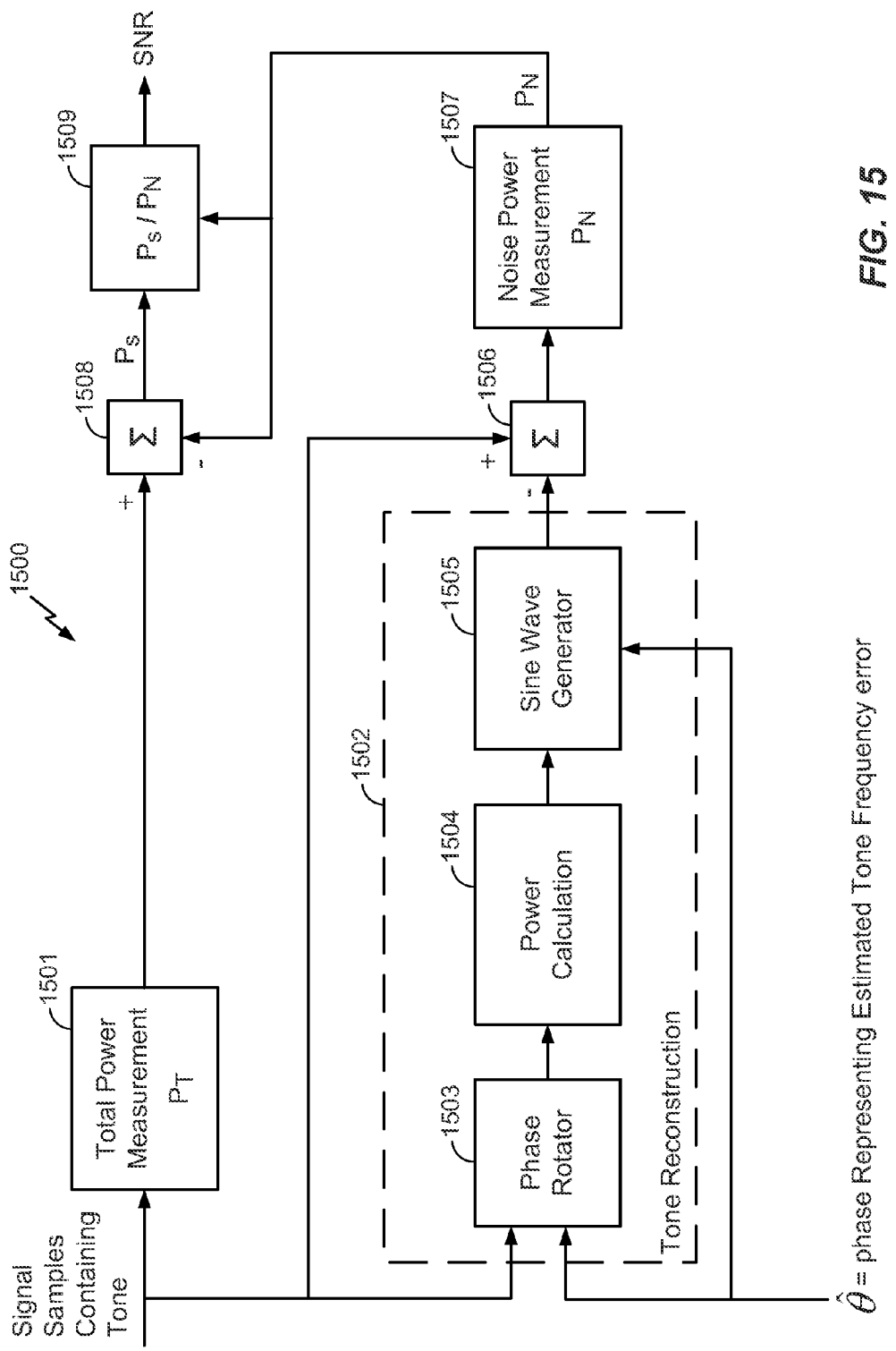
FIG. 15 is a diagram of a signal processing subsystem for performing an SNR computation.

FIG. 15 is a diagram of a signal processing subsystem 1500 for performing the signal-to-noise ratio computation described above. Received input samples representing received signals including the tone signal plus noise are input to a total power measurement block 1501 and a phase rotator 1503. Each input sample represents a complex function i+jq.

With reference to equations (4) and (5) above, the input samples that represent the tone signal plus noise may be represented by the equation $\tilde{r}_l = \tilde{\alpha}e_{(j l\theta+\phi)} + \tilde{n}_l$. The tone component of the input samples that represents only the tone signal without the noise component is $\tilde{\alpha}e^{(jl\theta+\phi)}$.

The amplitude of this tone component is $\tilde{\alpha}$ and the power of the tone component is the square of this value. The power of the signal samples can be obtained by squaring the in-phase and quadrature (real and imaginary) Cartesian co-ordinates (i and q) of the signal samples and summing the resulting squares to obtain a sum which represents the power of the tone signal plus noise (i.e., total power).

The total power measurement block 1501 thus acts to square the i and q (real and imaginary) components of each received input sample to produce square products and then adds the square products to produce a power value for that sample. The total power measurement block 1501 then sums the power values for all the input samples to produce a calculated total power for the tone signal plus the noise.

The input signal samples are also input to a tone reconstruction subsystem 1502 comprising a phase rotator 1503, a power calculation block 1504, and a sine wave generator 1505.

The phase rotator 1503 operates in a similar way to the phase rotator 1320 illustrated in FIG. 13. The phase rotator 1503 receives the input signal samples and a phase value θ representing the estimated tone frequency error (e.g., as estimated by the frequency error estimator 1340 illustrated in FIG. 13). The phase rotator 1503 increments a first input sample, having a phase $\phi$, by $\hat{\theta}$ to produce a first phase-rotated sample having phase $\hat{\theta}+\phi$. The phase rotator increments a second input sample, having a phase $2\phi$, by $2\hat{\theta}$ to produce a second phase-rotated sample having phase $2(\hat{\theta}+\phi)$, and so on. This incrementing of phase has the effect of adding a frequency offset equal to $(\hat{\theta}/T)$ where T is the sample interval and is the inverse of the sampling frequency $F_s$.

The phase rotator thus acts to rotate the phase of the input signal samples using the phase value $\hat{\theta}$ to produce phase-rotated samples. The phase-rotated samples represent the signals including the tone signal and noise, offset by the estimated tone frequency error $\hat{f}$ corresponding to the phase value $\hat{\theta}$ that was calculated, for example, by the frequency error estimator 1340 illustrated in FIG. 13.

The power calculation block 1504 computes and sums the powers of the phase-rotated samples in a similar way to the computation of total power performed by the total power measurement block 1501 described above, to produce a summed power value $(\tilde{\alpha}_1)^2$ for the rotated samples. The power calculation block 1504 uses this summed power value to compute a corresponding amplitude for a sine wave to be reconstructed, by computing the square root $\tilde{\alpha}_1$ of the summed power value $(\tilde{\alpha}_1)^2$.

The sine wave generator 1505 produces samples representing a reconstructed tone signal in the form of a sine wave by using a sine wave generation algorithm, based on the computed amplitude $\tilde{\alpha}_1$ and the phase value $\hat{\theta}$ representing the estimated tone frequency error $\hat{f}$. The samples output from the sine wave generator 1505 represent a reconstructed tone signal that has a frequency equal to the actual tone frequency of the input signal plus a measurement error.

The measurement error is a function of the noise in the input signal and error associated with the frequency estimation performed by the frequency estimator (e.g., frequency estimators 628, 1340). The measurement error includes (i) an 'AC' term having a mean error of zero and a standard deviation that is non-zero and finite, and (ii) a 'DC' term that represents a fixed error that can be either negative or positive and has a standard deviation of zero. The 'DC' term typically depends primarily on an accuracy of the frequency estimation. The 'AC' term typically depends primarily on the noise in the input signal.

Figure 16:
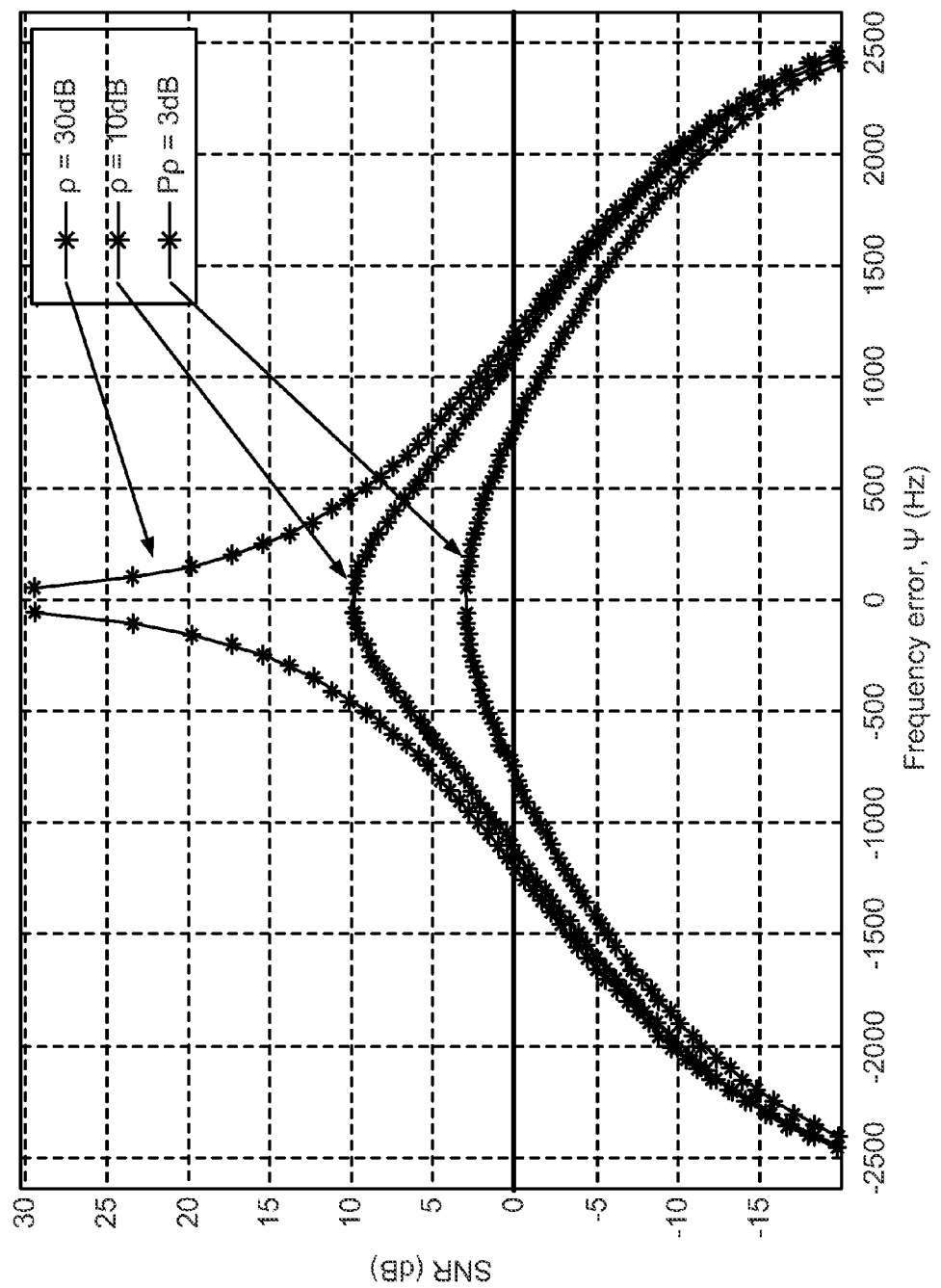
FIG. 16 illustrates an example relationship between a calculated SNR and an error in the estimated frequency error for select values of $\rho$.

FIG. 16 illustrates an example relationship between the calculated SNR and an error in the estimated frequency error for select values of ρ. With reference again to FIG. 15, if the noise in the input signal and the error associated with the frequency estimation were both zero then the measurement error would be zero and the samples generated by the sine wave generator 1505 would represent only the tone signal with no noise and no tone frequency error. As explained in relation to FIG. 6 above, the measured SNR of an estimated tone is high (e.g. 0 dB or above) only when the error in the estimated tone frequency error is within a relatively narrow frequency range (e.g., on the order of 2 KHz). This relatively narrow frequency range is significantly narrower than the range of tone frequencies of each hypothesis for frequency error, each hypothesis associated with a different offset frequency represented by a different value of $\phi_n$.

A first subtractor 1506 subtracts, on a sample-by-sample basis, the samples representing the reconstructed tone signal from the input samples to produce noise samples. Since the input samples represent the tone signal plus noise and the samples representing the reconstructed tone signal represent the tone signal with no added noise (assuming no measurement error), the noise samples represent the noise present in the sampled input signal. A noise power measurement block 1507 operates in a similar way to the operation of total power measurement block 1501 by computing the powers of the noise samples and summing those computed powers to calculate a noise power $P_N$. A second subtractor 1508 subtracts the calculated noise power $P_N$ from the calculated total power $P_T$ to produce a calculated tone signal power $P_S=P_T-P_N$. A divider 1509 divides the calculated tone signal power $P_s$ by the calculated noise power $P_N$ to produce the computed SNR.

Each different hypothesis of the multi-pass technique described above corresponds to a different range of tone frequencies. All three checks (each for a different hypothesis) are mutually exclusive, in that if one check yields a positive result the other checks yield negative results. The checks are mutually exclusive because the measured SNR of an estimated tone is high (e.g., 0 dB or above) only when the estimated tone frequency is within a relatively narrow frequency range (e.g., on the order of 2 KHz). This relatively narrow frequency range is significantly narrower than the range of tone frequencies of each hypothesis. The probability of false alarm is therefore substantially reduced.

Referring again to FIGS. 11 and 12, offset values for $\phi_1$ and $\phi_2$ of plus and minus π/5 respectively have been found to be advantageous when P=2, where P is the parameter used in equations (10) and (12) above and (2P+1) is the number of offset values created by rotating (2P+1) selected correlation values. For a given value of P, offset values of plus and minus π/(2P+1) have been found to be advantageous. Referring to FIG. 12, the central lobe of the function $\hat{f}$ is shifted to the right when an offset of π/(2P+1) is applied and the lobe is shifted to the left when an offset of π/(2P+1) is applied. These offsets correspond to plus and minus π/5 for P=2.

When these offset values are chosen, the peak of the central lobe of function $\hat{f}$ when no offset is applied is located at the same frequency as a null or zero-crossing frequency of the function $\hat{f}$ when an offset of π/(2P+1) is applied. Similarly, the peak of the central lobe of function $\hat{f}$ when an offset of π/(2P+1) is applied is located at the same frequency as a null or zero-crossing frequency of the function $\hat{f}$ when no offset is applied, as illustrated in FIG. 12. The amplitude of the function $\hat{f}$ is always high enough for at least one value of offset q as represented by the combined region of frequency under the three intersecting central largest lobes in FIG. 12. These offset values are spaced apart by a frequency difference that is approximately equal to the frequency estimation range.

According to the multi-pass techniques described above, the signal processing circuitry within the coarse frequency estimator 628 of FIG. 13 and the signal processing subsystem 1500 can perform the frequency estimation and measure the signal-to-noise ratio respectively for different frequency offsets so that the frequency offsets are spaced apart by approximately the frequency estimation range. Each frequency offset acts to enable the estimation of a frequency error that lies within a frequency estimation bandwidth centered at the middle of the offset bandwidth and having the same width as the frequency estimation range.

The different frequency offsets can thus be chosen and applied so that frequency ranges centered at the offset frequencies and having a width equal to the frequency estimation range together substantially cover the error bandwidth. The spacing between different frequency offsets is thus substantially greater than might be used simply to refine an estimate of the tone frequency error. When no frequency offset is applied (corresponding to a frequency offset of zero) and the tone frequency error is outside the frequency estimation range, the tone frequency error cannot be estimated until a particular frequency offset is applied.

The frequency offsets are applied so that the application of the particular frequency offset effectively serves to offset the tone frequency to within the frequency estimation range. This is achieved by applying the particular frequency offset to a portion of the signal samples to produce offset values that represent the signals (including the tone signal) occupying an offset bandwidth equal to the error bandwidth offset by the particular offset frequency.

This multi-pass technique has the advantage that the bandwidth over which tone frequency errors can be detected and estimated has a significantly greater frequency range than the frequency estimation range provided by a frequency error estimation algorithm such as that employed by the frequency error estimator 1340 described above. One advantage is that a frequency estimation algorithm having high accuracy may be used over a wider range of frequency error. Another advantage of the technique is that when a frequency error has been estimated using the particular frequency offset, that estimated frequency error can be treated as an accurate estimate of the tone frequency error and that estimated frequency error does not need to be refined. In other words, once a frequency estimate is obtained, further iterations are not required. This is unlike an iterative approach of obtaining a less accurate estimate and then performing iterations to provide successively more accurate estimates. The multi-pass technique is thus quicker and more efficient than traditional methods and provides a capability to estimate a greater range of tone frequency errors.

Referring again to FIGS. 9 and 10, it will be recalled from the above description that the signal processing circuitry can detect the tone by dividing the set of signal samples into blocks of N samples and coherently summing the blocks of N samples to produce plural coherent sums, then correlating the plural coherent sums and performing tone detection based on the plural coherent sums. It has been found that a value of N equal to 3 is advantageous when the tone frequency error is as high as 40 to 50 kHz (the maximum error likely to exist in real networks between the local oscillators of the base station and the mobile station). This value of 3 for N is advantageous for tone detection because it provides a gain in coherent SNR of greater than unity for tone frequency errors as high as 40 to 50 kHz, while still providing adequate gain for small tone frequency errors. This advantage can be seen by inspecting the values of the graphed function illustrated in FIG. 10 corresponding to frequency offsets of 0 kHz and 50 kHz (horizontal axis), and by noting the dashed horizontal line representing a value of unity for the graphed function.

Figure 17:
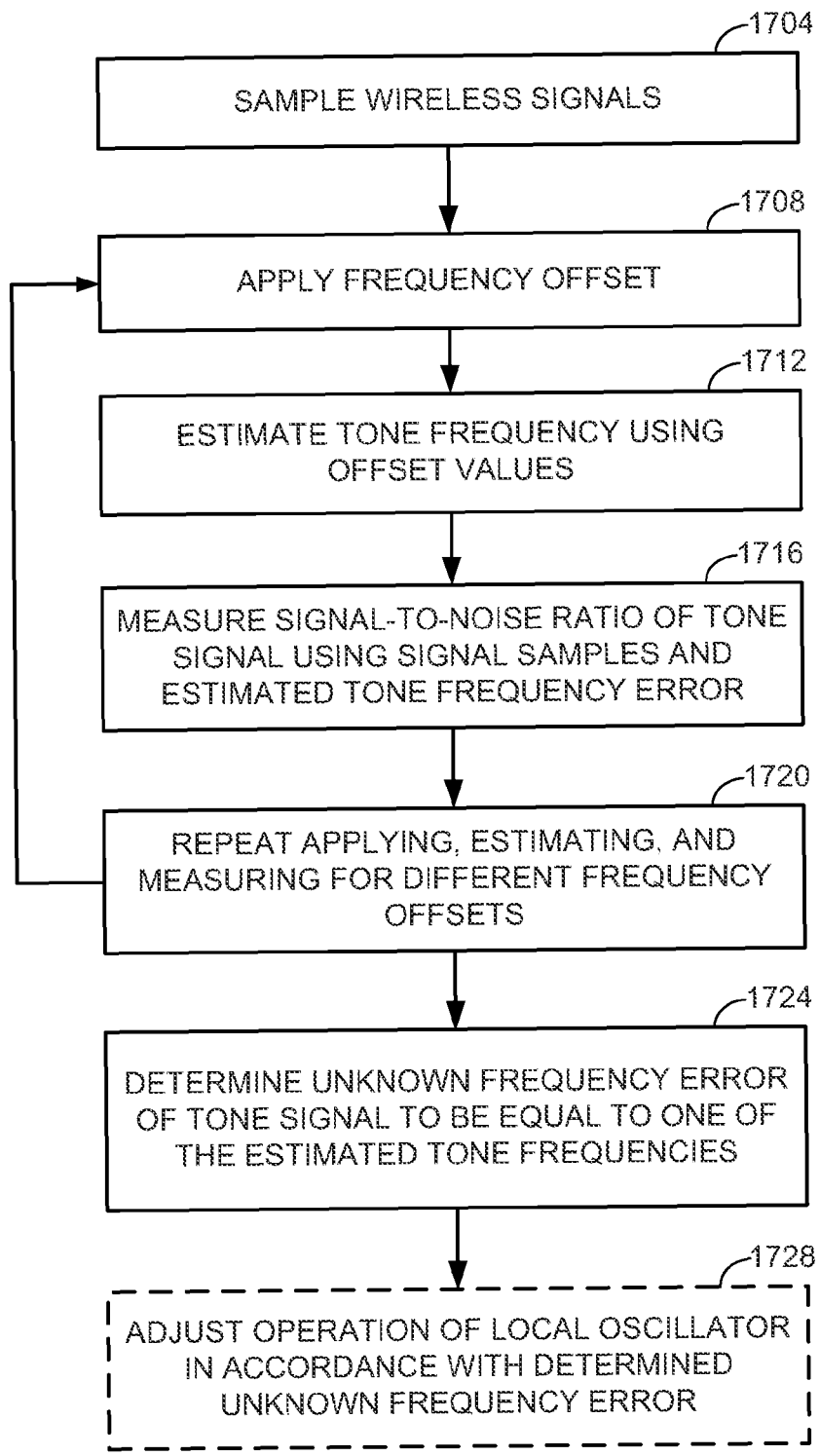
FIG. 17 illustrates a flow diagram of an example method for estimating an unknown frequency error of a tone signal according to one or more embodiments.

FIG. 17 illustrates a flow diagram of an example method for estimating an unknown frequency error of a tone signal according to one or more embodiments.

As shown, wireless signals including the tone signal that occupy an error bandwidth may be sampled, within the error bandwidth, to generate signal samples (block 1704). A frequency offset may be applied to the signal samples to produce offset values that represent the signals occupying an offset bandwidth equal to the error bandwidth offset by an offset frequency (block 1708). A tone frequency error may be estimated, within a frequency estimation range less than the error bandwidth, using the offset values (block 1712). A signal-to-noise ratio of the tone signal may be measured using the signal samples and the estimated tone frequency error (block 1716). The applying (block 1708), estimating (block 1712), and measuring (block 1716) may be repeated for different frequency offsets (block 1720). When a particular frequency offset has been applied which results in a particular estimated tone frequency error and a measured signal-to-noise ratio that is above a threshold, that particular estimated tone frequency error may be determined to be equal to the unknown frequency error of the tone signal (block 1724).

As discussed above, the estimated frequency error may be useful for adjusting the local oscillator of a given wireless communication device. Accordingly, in some embodiments, the operation of a local oscillator may be adjusted in accordance with the determined unknown frequency error of the tone signal (block 1728).

As discussed in more detail above, in some embodiments, the different frequency offsets may be spaced apart by approximately the frequency estimation range. Further, the different frequency offsets may have associated frequency ranges centered at the offset bandwidths and associated widths equal to the frequency estimation range that together substantially cover the error bandwidth. The offset values may be generated by auto-correlating the signal samples to produce correlation values and rotating the phases of the correlation values by a phase representing the frequency offset.

In some embodiments, the tone frequency error may be estimated by summing the offset values to produce a complex sum, calculating the phase of the complex sum and de-rotating the phase of the complex sum by the phase representing the frequency offset to produce a phase representing the estimated tone frequency error. In some embodiments, the summing may comprise summing only odd-numbered offset values to produce the complex sum. For example, the summing may comprise summing real and imaginary values of the largest positive odd-numbered offset value among the odd-numbered offset values, and summing only the real values for the remaining odd-numbered offset values among the odd-numbered offset values. As another example, the summing may comprise multiplying the real parts of all positive odd-numbered offset values among the odd-numbered offset values by two, except for the largest positive odd-numbered offset value, to produce doubled values, adding the doubled values together to produce a smart sum, and adding the largest positive odd-numbered offset value to the smart sum to produce the complex sum. The odd-numbered offset values may comprise less than seven offset values, such as only offset values numbered 1, 3, and 5.

Measuring the signal-to-noise ratio of the tone signal may comprise measuring the total power of the signal samples, measuring a noise power of the signal samples, and subtracting the measured noise power from the measured total power to obtain a signal power of the tone. Measuring the noise power of the signal samples may comprise generating sine wave samples representing a regenerated tone using the signal samples and a phase representing the estimated tone frequency error, subtracting the sine wave samples from the signal samples to produce noise samples, and measuring the power of the noise samples. Generating the sine wave samples may comprise rotating the phase of the signal samples by the phase representing the estimated tone frequency error to produce rotated signal samples, computing and summing the powers of the rotated signal samples to produce a power sum, and generating sine wave samples based on a specified tone frequency and the power sum.

In some embodiments, the tone signal may be detected by dividing the signal samples into blocks of three samples and coherently summing the blocks of three samples to produce plural coherent sums, correlating the plural coherent sums, and performing tone detection based on the plural coherent sums.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" as used herein encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of estimating an unknown frequency error of a tone signal, the method comprising:
- sampling, within an error bandwidth, wireless signals including the tone signal that occupy the error bandwidth to generate signal samples;
- applying a frequency offset to the signal samples to produce offset values that represent the signals occupying an offset bandwidth equal to the error bandwidth offset by an offset frequency, wherein applying the frequency offset to produce the offset values comprises:
  - auto-correlating the signal samples to produce correlation values; and
  - rotating the phase of each correlation value by a phase representing the frequency offset;
- estimating, within a frequency estimation range less than the error bandwidth, a tone frequency error using the offset values;
- measuring a signal-to-noise ratio of the tone signal using the signal samples and the estimated tone frequency error;
- upon determining that the measured signal-to-noise ratio does not satisfy a threshold, repeating the applying, estimating, and measuring for different frequency offsets; and
- upon determining that the measured signal-to-noise ratio satisfies the threshold, determining, that the unknown frequency error of the tone signal is equal to the particular estimated tone frequency error.

2. The method of claim 1, further comprising adjusting operation of a local oscillator in accordance with the determined unknown frequency error of the tone signal.

3. The method of claim 1, wherein the different frequency offsets are spaced apart by approximately the frequency estimation range.

4. The method of claim 1, wherein the different frequency offsets have associated frequency ranges centered at the offset bandwidths and associated widths equal to the frequency estimation range that together substantially cover the error bandwidth.

5. The method of claim 1, wherein the tone frequency error is estimated by summing the offset values to produce a complex sum, calculating the phase of the complex sum and de-rotating the phase of the complex sum by the phase representing the frequency offset to produce a phase representing the estimated tone frequency error.

6. The method of claim 5, wherein the summing comprises summing only odd-numbered offset values to produce the complex sum.

7. The method of claim 6, wherein the summing comprises:
- summing real and imaginary values of the largest positive odd-numbered offset value among the odd-numbered offset values; and
- summing only the real values for the remaining odd-numbered offset values among the odd-numbered offset values.

8. The method of claim 6, wherein the summing comprises:
- multiplying the real parts of all positive odd-numbered offset values among the odd-numbered offset values by two, except for the largest positive odd-numbered offset value, to produce doubled values;
- adding the doubled values together to produce a smart sum; and
- adding the largest positive odd-numbered offset value to the smart sum to produce the complex sum.

9. The method of claim 6, wherein the odd-numbered offset values comprise less than seven offset values.

10. The method of claim 9, wherein the odd-numbered offset values comprise only offset values numbered 1, 3, and 5.

11. The method of claim 1, wherein measuring the signal-to-noise ratio of the tone signal comprises:
- measuring the total power of the signal samples;
- measuring a noise power of the signal samples; and
- subtracting the measured noise power from the measured total power to obtain a signal power of the tone signal.

12. The method of claim 11, wherein measuring the noise power of the signal samples comprises:
- generating sine wave samples representing a regenerated tone using the signal samples and a phase representing the estimated tone frequency error;
- subtracting the sine wave samples from the signal samples to produce noise samples; and
- measuring the power of the noise samples.

13. The method of claim 12, wherein generating the sine wave samples comprises:
- rotating the phase of the signal samples by the phase representing the estimated tone frequency error to produce rotated signal samples;
- computing and summing the powers of the rotated signal samples to produce a power sum; and
- generating sine wave samples based on a specified tone frequency and the power sum.

14. The method of claim 1, further comprising:
- detecting the tone signal by dividing the signal samples into blocks of three samples and coherently summing the blocks of three samples to produce plural coherent sums;
- correlating the plural coherent sums; and
- performing tone detection based on the plural coherent sums.

15. An apparatus for estimating an unknown frequency error of a tone signal, the apparatus comprising:
- a sampler for sampling, within an error bandwidth, wireless signals including the tone signal that occupy the error bandwidth to generate signal samples; and
- signal processing circuitry configured to:
  - apply a frequency offset to the signal samples to produce offset values that represent the signals occupying an offset bandwidth equal to the error bandwidth offset by an offset frequency, wherein applying the frequency offset to produce the offset values comprises the signal processing circuitry being configured to:
    - auto-correlate the signal samples to produce correlation values; and
    - rotate the phase of each correlation value by a phase representing the frequency offset;
  - estimate, within a frequency estimation range less than the error bandwidth, a tone frequency error using the offset values;
  - measure a signal-to-noise ratio of the tone signal using the signal samples and the estimated tone frequency error;
  - repeat the applying, estimating, and measuring for different frequency offsets upon determining that the measured signal-to-noise ratio does not satisfy a threshold; and
  - determine that the unknown frequency error of the tone signal is equal to the particular estimated tone frequency error upon determining that the measured signal-to-noise ratio satisfies the threshold.

16. The apparatus of claim 15, further comprising an adjustment module configured to adjust operation of a local oscillator in accordance with the determined unknown frequency error of the tone signal.

17. The apparatus of claim 15, wherein the different frequency offsets are spaced apart by approximately the frequency estimation range.

18. The apparatus of claim 15, wherein the different frequency offsets have associated frequency ranges centered at the offset bandwidths and associated widths equal to the frequency estimation range that together substantially cover the error bandwidth.

19. The apparatus of claim 15, wherein the tone frequency error is estimated by summing the offset values to produce a complex sum, calculating the phase of the complex sum and de-rotating the phase of the complex sum by the phase representing the frequency offset to produce a phase representing the estimated tone frequency error.

20. The apparatus of claim 19, wherein the summing comprises summing only odd-numbered offset values to produce the complex sum.

21. The apparatus of claim 20, wherein the summing comprises:
   summing real and imaginary values of the largest positive odd-numbered offset value among the odd-numbered offset values; and
   summing only the real values for the remaining odd-numbered offset values among the odd-numbered offset values.

22. The apparatus of claim 21, wherein the summing comprises:
   multiplying the real parts of all positive odd-numbered offset values among the odd-numbered offset values by two, except for the largest positive odd-numbered offset value, to produce doubled values;
   adding the doubled values together to produce a smart sum; and
   adding the largest positive odd-numbered offset value to the smart sum to produce the complex sum.

23. The apparatus of claim 21, wherein the odd-numbered offset values comprise less than seven offset values.

24. The apparatus of claim 21, wherein the odd-numbered offset values comprise only offset values numbered 1, 3, and 5.

25. The apparatus of claim 15, wherein measuring the signal-to-noise ratio of the tone signal comprises:
   measuring the total power of the signal samples;
   measuring a noise power of the signal samples; and
   subtracting the measured noise power from the measured total power to obtain a signal power of the tone.

26. The apparatus of claim 25, wherein measuring the noise power of the signal samples comprises:
   generating sine wave samples representing a regenerated tone using the signal samples and a phase representing the estimated tone frequency error;
   subtracting the sine wave samples from the signal samples to produce noise samples; and
   measuring the power of the noise samples.

27. The apparatus of claim 26, wherein generating the sine wave samples comprises:
   rotating the phase of the signal samples by the phase representing the estimated tone frequency error to produce rotated signal samples;
   computing and summing the powers of the rotated signal samples to produce a power sum; and
   generating the sine wave samples based on a specified tone frequency and the power sum.

28. The apparatus of claim 15, wherein the signal processing circuitry is further configured to:

detect the tone signal by dividing the signal samples into blocks of three samples and coherently summing the blocks of three samples to produce plural coherent sums;
   correlate the plural coherent sums; and
   perform tone detection based on the plural coherent sums.

29. The apparatus of claim 15, further comprising:
   a receiver unit for processing radiated signals including a carrier signal having an unknown frequency error and noise signals, the carrier signal being frequency-modulated by a tone signal, and for providing baseband signals including the tone signal and baseband noise signals to the signal processing circuitry.

30. An apparatus for estimating an unknown frequency error of a tone signal, the apparatus comprising:
   means for sampling, within an error bandwidth, wireless signals including the tone signal that occupy the error bandwidth to generate signal samples;
   means for applying a frequency offset to the signal samples to produce offset values that represent the signals occupying an offset bandwidth equal to the error bandwidth offset by an offset frequency, wherein the means for applying the frequency offset to produce the offset values comprises:
      means for auto-correlating the signal samples to produce correlation values; and
      means for rotating the phase of each correlation value by a phase representing the frequency offset;
   means for estimating, within a frequency estimation range less than the error bandwidth, a tone frequency error using the offset values;
   means for measuring a signal-to-noise ratio of the tone signal using the signal samples and the estimated tone frequency error;
   means for repeating the applying, estimating, and measuring for different frequency offsets upon determining that the measured signal-to-noise ratio does not satisfy a threshold; and
   means for determining that the unknown frequency error of the tone signal is equal to the particular estimated tone frequency error upon determining that the measured signal-to-noise ratio satisfies the threshold.

31. The apparatus of claim 30, further comprising means for adjusting operation of a local oscillator in accordance with the determined unknown frequency error of the tone signal.

32. The apparatus of claim 30, wherein the different frequency offsets are spaced apart by approximately the frequency estimation range.

33. The apparatus of claim 30, wherein the different frequency offsets have associated frequency ranges centered at the offset bandwidths and associated widths equal to the frequency estimation range that together substantially cover the error bandwidth.

34. The apparatus of claim 30, wherein the tone frequency error is estimated by means for summing the offset values to produce a complex sum, means for calculating the phase of the complex sum and means for de-rotating the phase of the complex sum by the phase representing the frequency offset to produce a phase representing the estimated tone frequency error.

35. The apparatus of claim 34, wherein the means for summing comprises means for summing only odd-numbered offset values to produce the complex sum.

36. The apparatus of claim 35, wherein the means for summing comprises:
   means for summing real and imaginary values of the largest positive odd-numbered offset value among the odd-numbered offset values; and means for summing only the real values for the remaining odd-numbered offset values among the odd-numbered offset values.

37. The apparatus of claim 35, wherein the means for summing comprises:
means for multiplying the real parts of all positive odd-numbered offset values among the odd-numbered offset values by two, except for the largest positive odd-numbered offset value, to produce doubled values;
means for adding the doubled values together to produce a smart sum; and
means for adding the largest positive odd-numbered offset value to the smart sum to produce the complex sum.

38. The apparatus of claim 35, wherein the odd-numbered offset values comprise less than seven offset values.

39. The apparatus of claim 38, wherein the odd-numbered offset values comprise only offset values numbered 1, 3, and 5.

40. The apparatus of claim 30, wherein means for measuring the signal-to-noise ratio of the tone signal comprises:
means for measuring the total power of the signal samples;
means for measuring a noise power of the signal samples; and
means for subtracting the measured noise power from the measured total power to obtain a signal power of the tone.

41. The apparatus of claim 40, wherein means for measuring the noise power of the signal samples comprises:
means for generating sine wave samples representing a regenerated tone using the signal samples and a phase representing the estimated tone frequency error;
means for subtracting the sine wave samples from the signal samples to produce noise samples; and
means for measuring the power of the noise samples.

42. The apparatus of claim 41, wherein means for generating the sine wave samples comprises:
means for rotating the phase of the signal samples by the phase representing the estimated tone frequency error to produce rotated signal samples;
means for computing and summing the powers of the rotated signal samples to produce a power sum; and
means for generating sine wave samples based on a specified tone frequency and the power sum.

43. The apparatus of claim 30, further comprising:
means for detecting the tone signal by dividing the signal samples into blocks of three samples and coherently summing the blocks of three samples to produce plural coherent sums;
means for correlating the plural coherent sums; and
means for performing tone detection based on the plural coherent sums.

44. A computer-readable storage device comprising code, which, when executed by a processor, cause the processor to perform operations for estimating an unknown frequency error of a tone signal, the computer-readable storage device comprising:
code for sampling, within an error bandwidth, wireless signals including the tone signal that occupy the error bandwidth to generate signal samples;
code for applying a frequency offset to the signal samples to produce offset values that represent the signals occupying an offset bandwidth equal to the error bandwidth offset by an offset frequency, wherein the code for applying the frequency offset to produce the offset values comprises:
code for auto-correlating the signal samples to produce correlation values; and
code for rotating the phase of each correlation value by a phase representing the frequency offset;
code for estimating, within a frequency estimation range less than the error bandwidth, a tone frequency error using the offset values;
code for measuring a signal-to-noise ratio of the tone signal using the signal samples and the estimated tone frequency error;
code for repeating the applying, estimating, and measuring for different frequency offsets upon determining that the measured signal-to-noise ratio does not satisfy a threshold; and
code for determining that the unknown frequency error of the tone signal is equal to the particular estimated tone frequency error upon determining that the measured signal-to-noise ratio satisfies the threshold.

45. The computer-readable storage device of claim 44, further comprising code for adjusting operation of a local oscillator in accordance with the determined unknown frequency error of the tone signal.

46. The computer-readable storage device of claim 44, wherein the different frequency offsets are spaced apart by approximately the frequency estimation range.

47. The computer-readable storage device of claim 44, wherein the different frequency offsets have associated frequency ranges centered at the offset bandwidths and associated widths equal to the frequency estimation range that together substantially cover the error bandwidth.

48. The computer-readable storage device of claim 44, wherein the tone frequency error is estimated by code for summing the offset values to produce a complex sum, code for calculating the phase of the complex sum and code for de-rotating the phase of the complex sum by the phase representing the frequency offset to produce a phase representing the estimated tone frequency error.

49. The computer-readable storage device of claim 48, wherein the code for summing comprises code for summing only odd-numbered offset values to produce the complex sum.

50. The computer-readable storage device of claim 49, wherein the code for summing comprises:
code for summing real and imaginary values of the largest positive odd-numbered offset value among the odd-numbered offset values; and
code for summing only the real values for the remaining odd-numbered offset values among the odd-numbered offset values.

51. The computer-readable storage device of claim 49, wherein the code for summing comprises:
code for multiplying the real parts of all positive odd-numbered offset values among the odd-numbered offset values by two, except for the largest positive odd-numbered offset value, to produce doubled values;
code for adding the doubled values together to produce a smart sum; and
code for adding the largest positive odd-numbered offset value to the smart sum to produce the complex sum.

52. The computer-readable storage device of claim 49, wherein the odd-numbered offset values comprise less than seven offset values.

53. The computer-readable storage device of claim 52, wherein the odd-numbered offset values comprise only offset values numbered 1, 3, and 5.

54. The computer-readable storage device of claim 44, wherein code for measuring the signal-to-noise ratio of the tone signal comprises:
code for measuring the total power of the signal samples;

code for measuring a noise power of the signal samples; and code for subtracting the measured noise power from the measured total power to obtain a signal power of the tone.

55. The computer-readable storage device of claim 54, wherein code for measuring the noise power of the signal samples comprises:

code for generating sine wave samples representing a regenerated tone using the signal samples and a phase representing the estimated tone frequency error;

code for subtracting the sine wave samples from the signal samples to produce noise samples; and code for measuring the power of the noise samples.

56. The computer-readable storage device of claim 55, wherein code for generating the sine wave samples comprises:

code for rotating the phase of the signal samples by the phase representing the estimated tone frequency error to produce rotated signal samples;

code for computing and summing the powers of the rotated signal samples to produce a power sum; and code for generating the sine wave samples based on a specified tone frequency and the power sum.

57. The computer-readable storage device of claim 44, further comprising:

code for detecting the tone signal by dividing the signal samples into blocks of three samples and coherently summing the blocks of three samples to produce plural coherent sums;

code for correlating the plural coherent sums; and code for performing tone detection based on the plural coherent sums.

* * * * *